US011330131B2

(12) United States Patent
Nishiyama

(10) Patent No.: US 11,330,131 B2
(45) Date of Patent: May 10, 2022

(54) IMAGE PROCESSING APPARATUS AND CONTROL METHOD FOR MANAGING VALUES RELATED TO A FUNCTION OF THE IMAGE PROCESSING APPARATUS

(71) Applicant: CANON KABUSHIKI KAISHA, Tokyo (JP)

(72) Inventor: Masashi Nishiyama, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/238,042

(22) Filed: Apr. 22, 2021

(65) Prior Publication Data

US 2021/0352186 A1 Nov. 11, 2021

(30) Foreign Application Priority Data

May 8, 2020 (JP) .............................. JP2020-082426

(51) Int. Cl.
*H04N 1/00* (2006.01)
(52) U.S. Cl.
CPC ....... *H04N 1/00949* (2013.01); *H04N 1/0097* (2013.01); *H04N 1/00342* (2013.01); *H04N 1/00474* (2013.01); *H04N 1/00482* (2013.01); *H04N 1/00503* (2013.01); *H04N 1/00517* (2013.01)
(58) Field of Classification Search
None
See application file for complete search history.

(56) References Cited

U.S. PATENT DOCUMENTS

| 7,327,478 B2* | 2/2008 | Matsuda | H04N 1/00204 358/1.13 |
| 2007/0182982 A1* | 8/2007 | Hayashida | H04N 1/0035 358/1.14 |
| 2008/0304849 A1* | 12/2008 | Harigae | G03G 15/5016 399/83 |
| 2012/0099134 A1* | 4/2012 | Harigae | G03G 15/5016 358/1.13 |
| 2014/0176987 A1* | 6/2014 | Sakagami | H04N 1/4426 358/1.14 |
| 2015/0370517 A1* | 12/2015 | Tokumaru | G06F 3/1257 358/1.15 |
| 2015/0373215 A1* | 12/2015 | Hayashi | H04N 1/4406 358/1.14 |

(Continued)

FOREIGN PATENT DOCUMENTS

JP 2018186517 A 11/2018

*Primary Examiner* — Henok Shiferaw
(74) *Attorney, Agent, or Firm* — Canon U.S.A., Inc. I.P. Division

(57) ABSTRACT

An image processing apparatus includes a management unit configured to manage a shortcut in association with one or more pieces of card information and a control unit configured to execute display control on a display, wherein, when first card information and second card information are managed in association with a first shortcut, the control unit executes control on a screen for the function corresponding to the first shortcut to display in a state where the corresponding group of setting values is applied to the function even if either one of the first card information and the second card information is read. Further, the number of pieces of card information that can be associated with the shortcut has an upper limit.

9 Claims, 24 Drawing Sheets

(56) References Cited

U.S. PATENT DOCUMENTS

2015/0381839 A1* 12/2015 Adachi ............. H04N 1/00225
                                                    358/474
2017/0187912 A1*  6/2017 Tamura ............. H04N 1/32122
2018/0247048 A1*  8/2018 Sakemi .................. G06F 21/45

* cited by examiner

FIG.6

| FAVORITE ID | FUNCTION | SETTING |
|---|---|---|
| F0001 | COPY | COPIES: 1, LAYOUT SETTING: 2in1, TWO-SIDED PRINT SETTING: TWO SIDES, COLOR SETTING: BLACK AND WHITE |
| F0005 | SCAN AND SEND | FORMAT: jpeg, TRANSMISSION DESTINATION: SMB\\172.20.83.168\folder, RESOLUTION: 400 dpi |
| ...... | ...... | ...... |

601  602  603

610  611

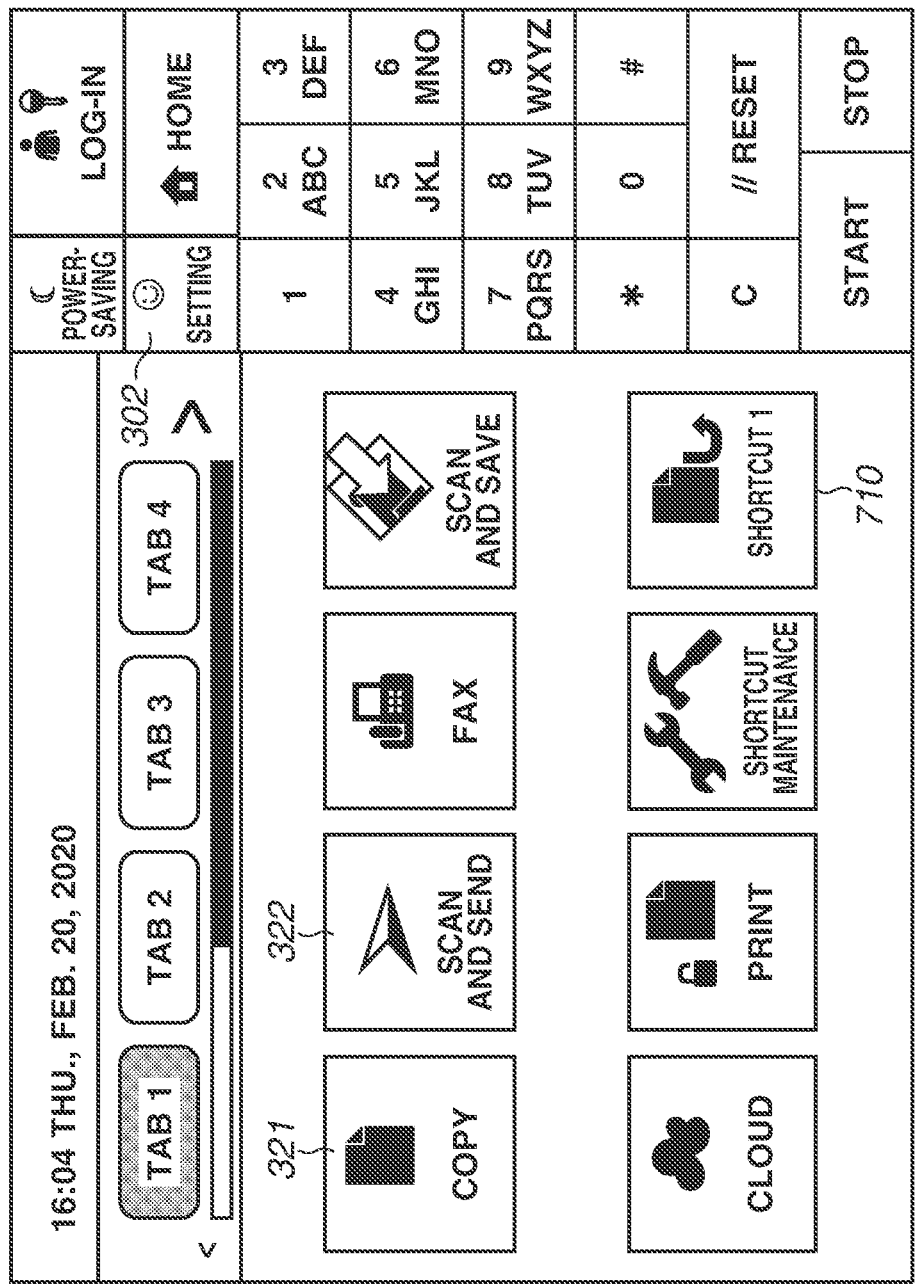

FIG.8

| | 801 | 802 | 803 | 804 |
|---|---|---|---|---|
| | SHORTCUT ID | FUNCTION | CALLED FAVORITE | LOCATION |
| 810 | S0001 | COPY | F0001 | |
| | ⋮ | ⋮ | ⋮ | ⋮ |

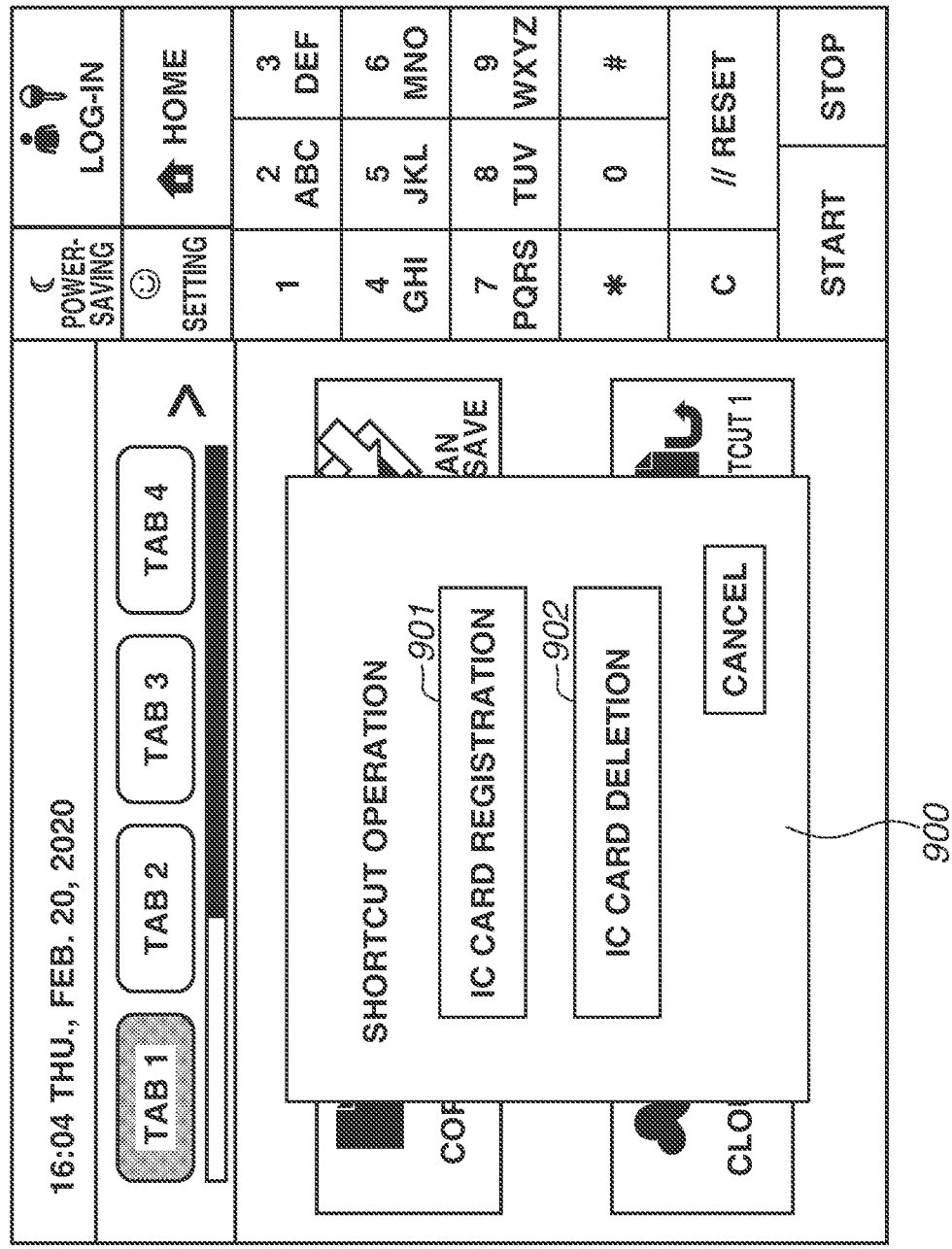

FIG.10

| CARD ID *1001* | SHORTCUT ID *1002* | REGISTRATION DATE *1003* |
|---|---|---|
| 03BAF394AE277C80 *(1010)* | S0001 | 20200110 |
| 02GFG434DF155D21 *(1011)* | S0001 | 20200303 |
| 0AE6BCC429D83E32 | S0032 | 20191212 |
| ⋮ | ⋮ | ⋮ |

IMAGE PROCESSING APPARATUS AND CONTROL METHOD FOR MANAGING VALUES RELATED TO A FUNCTION OF THE IMAGE PROCESSING APPARATUS

BACKGROUND

Field

The present disclosure relates to a technique for improving operability of an image forming apparatus.

Description of the Related Art

There is a case where a function (application) of an image processing apparatus such as a printer, a scanner, and a multifunction peripheral (MFP) and a combination of setting values (i.e., shortcut) relating to that function are managed in association with user information.

Even in a case where user management is not executed for the MFP, optional IC card information such as a manufacturing number or a card ID may be managed in association with a shortcut. For example, according to a technique discussed in Japanese Patent Application Laid Open No. 2018-186517, a shortcut associated with card information can easily be called by reading a card through the MFP.

In a case where association between the card information and the shortcut can only be managed on a one-to-one basis, a user will face restrictions on the usability of the shortcut and the operability of the image processing apparatus.

SUMMARY

According to various embodiments of the present disclosure, an image processing apparatus provided with a display and configured to read card information from a card, and to provide at least any one of a function using a scanner and a function using a printer, includes a management unit configured to manage a combination of a function provided by the image processing apparatus and a group of setting values used for the function in association with one or more pieces of card information, wherein the number of pieces of card information that can be associated with the combination of the function and the group of setting values has an upper limit, and a control unit configured to execute display control on the display, wherein, in the display control, in a case where first card information and second card information are managed in association with a first combination that is a combination of the function provided by the image processing apparatus and the group of setting values used for the function, the control unit controls a screen for the function corresponding to the first combination to display in a state where the corresponding group of setting values is applied to the function, even if either one of the first card information and the second card information is read.

Further features will become apparent from the following description of exemplary embodiments with reference to the attached drawings.

BRIEF DESCRIPTION OF THE DRAWINGS

FIG. 6 is a diagram illustrating a favorite management table according to the exemplary embodiment.

FIGS. 7A and 7B are diagrams illustrating a shortcut registration according to the exemplary embodiment.

FIG. 8 is a diagram illustrating a shortcut management table according to the exemplary embodiment.

FIGS. 9A and 9B are diagrams illustrating an integrated circuit (IC) card management screen according to the exemplary embodiment.

FIG. 10 is a diagram illustrating a card information management table according to the exemplary embodiment.

DESCRIPTION OF THE EMBODIMENTS

Hereinafter, an exemplary embodiment will be described with reference to the appended drawings.

Figure 1:
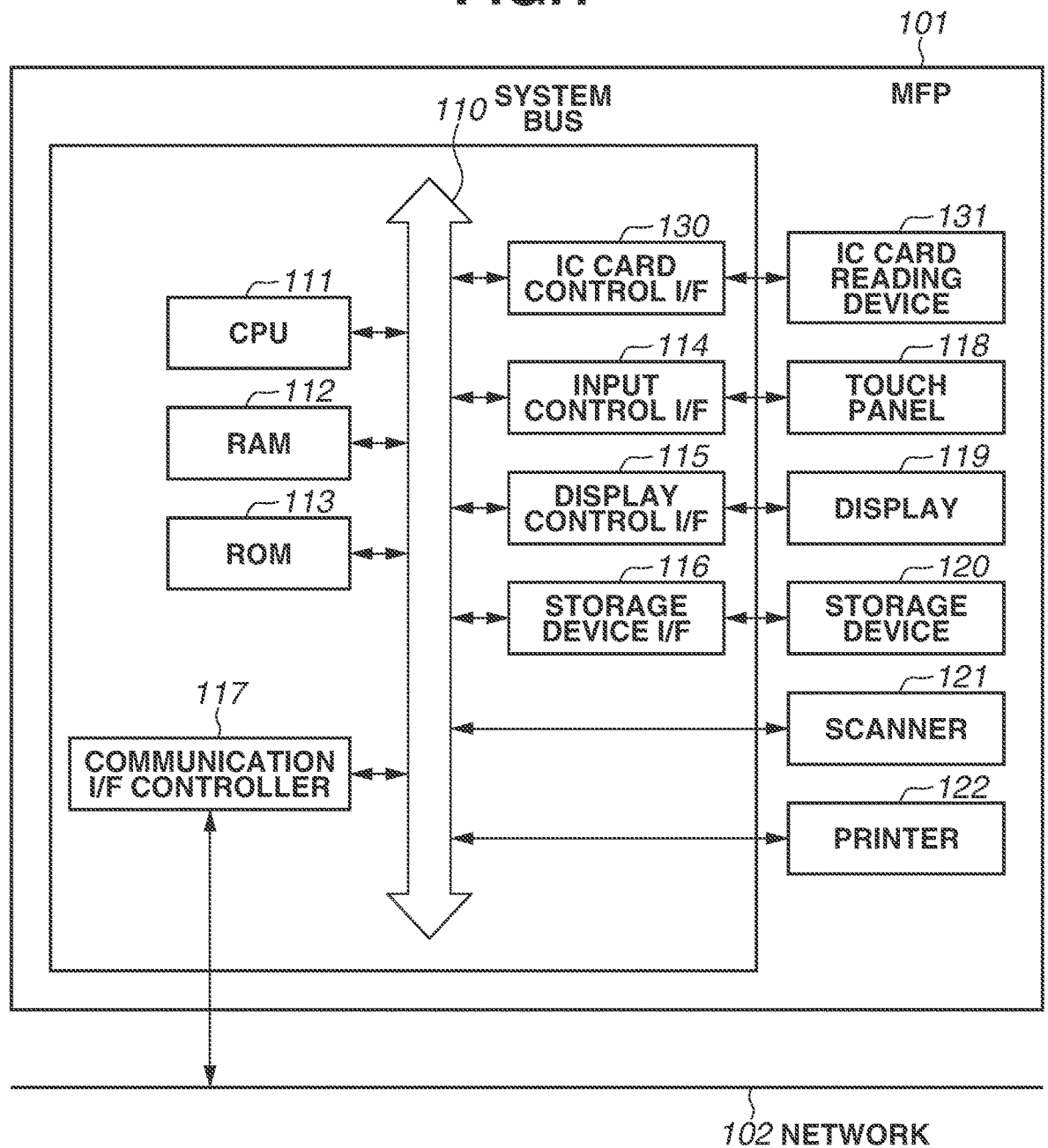
FIG. 1 is a block diagram illustrating a controller unit of a multifunction peripheral (MFP) according to an exemplary embodiment.

FIG. 1 is a block diagram illustrating an example of a hardware configuration of a multifunction peripheral (MFP) 101 as an example of an image processing apparatus according to a first exemplary embodiment. The configuration in FIG. 1 is merely an example for describing the present exemplary embodiment. Therefore, it is needless to say that any configuration including another constituent element or having an effect similar to the effect achieved by the present exemplary embodiment can be applied thereto.

A central processing unit (CPU) 111, a random access memory (RAM) 112, a read only memory (ROM) 113, an input control interface (I/F) 114, a display control I/F 115, a storage device I/F 116, and a communication I/F controller 117 are connected to a system bus 110. A scanner 121 and a printer 122 are also connected to the system bus 110. Respective units connected to the system bus 110 can mutually exchange data via the system bus 110.

The CPU 111 executes device control, data calculation, and data processing. The RAM 112 is a volatile memory used as a temporary storage area of the CPU 111 such as a main memory or a work area. The ROM 113 is a non-volatile memory with image data, the other data, and various programs for operating the CPU 111 stored in predetermined areas thereof. For example, according to a program stored in the ROM 113, the CPU 111 uses the RAM 112 as a work memory to control respective units of the MFP 101. In addition, a program for implementing the processing according to the present exemplary embodiment illustrated in the flowcharts described below, executed by the CPU 111, may be stored in the storage device 120 instead of the ROM 113.

The input control I/F 114 accepts a user operation and generates a control signal in response to the operation and supplies the control signal to the CPU 111. For example, the input control I/F 114 is connected to input devices for accepting user operations, for example, a text information input device such as a keyboard (not illustrated), hard keys (not illustrated) for directly inputting numerical values, and a pointing device such as the touch panel 118. The touch panel 118 is an input device that outputs coordinate information according to a position at which the user has touched an input portion having a planar configuration. Hereinafter, in the present exemplary embodiment, the operation is executed through the touch panel 118. However, it is needless to say that the operation method is not limited thereto. Based on a control signal generated and supplied by the input control I/F 114 corresponding to the user operation executed on the input device, the CPU 111 controls the respective units of the MFP 101 according to the program. With this control, an operation corresponding to the user operation can be executed by the MFP 101.

The display control I/F 115 outputs a display signal to display an image on the display 119. For example, the CPU 111 generates a display control signal and supplies the display control signal to the display control I/F 115 based on the program. Based on the display control signal, the display control I/F 115 generates a display signal and outputs the display signal to the display 119. For example, based on the display control signal generated by the CPU 111, the display control I/F 115 displays, on the display 119, a GUI screen constituting a graphical user interface (GUI). In addition, the touch panel 118 may be configured integrally with the display 119. For example, the touch panel 118 is formed so that the light transmittance thereof does not interfere with display of the display 119, and attached to an upper layer of a display surface of the display 119. Then, input coordinates of the touch panel 118 are associated with display coordinates of the display 119. In this way, it is possible to constitute a GUI that gives feeling to the user as if the user directly operates a screen displayed on the display 119.

The storage device 120 such as a hard disk drive (HDD) or a flash memory is connected to the storage device I/F 116. Based on the control executed by the CPU 111, data is read from and written into the storage device 120. The storage device 120 may be used in place of the RAM 112 or the ROM 113.

Based on the control executed by the CPU 111, the communication I/F controller 117 executes communication with respect to various networks such as a local area network (LAN), the internet, and a wired/wireless network. Various apparatuses such as a personal computer (PC), another MFP, a printer, and a server are connected to the network 102 so as to be communicable with the MFP 101. Further, the MFP 101 is also connected to an external authentication server described below via the communication I/F controller 117.

Based on the control executed by the CPU 111, the scanner 121 reads a document and generates image data. For example, in response to a user instruction received via the input control I/F 114, the CPU 111 causes the scanner 121 to execute scanning processing. The scanner 121 reads and digitizes a document placed on a document table or an auto-document feeder (ADF) to generate image data. Then, the scanner 121 stores the generated image data in the storage device 120 via the storage device I/F 116.

Based on the control executed by the CPU 111, the printer 122 executes printing processing of image data stored in the storage device 120. For example, the CPU 111 causes the printer 122 to execute printing processing based on a user instruction received via the input control I/F 114 or an instruction received from an external device via the communication I/F controller 117. The printer 122 reads image data from the storage device 120, converts the image data into data of a printable format, and prints an image on a document sheet.

The IC card control I/F 130 outputs an instruction signal for reading an IC card to the IC card reading device 131. The IC card described in the present exemplary embodiment is a non-contact IC card having a near field communication (NFC) function. For example, the CPU 111 generates an IC card control signal and supplies the IC card control signal to the IC card control I/F 130 according to a program. Based on the control signal, the IC card control I/F 130 generates an IC card reading signal and outputs the IC card reading signal to the IC card reading device 131. The IC card reading device 131 reads card information such as a manufacturing number and a card ID of the IC card that is held over the IC card reading device 131 and outputs a reading result signal to the IC card control I/F 130.

Figure 2:
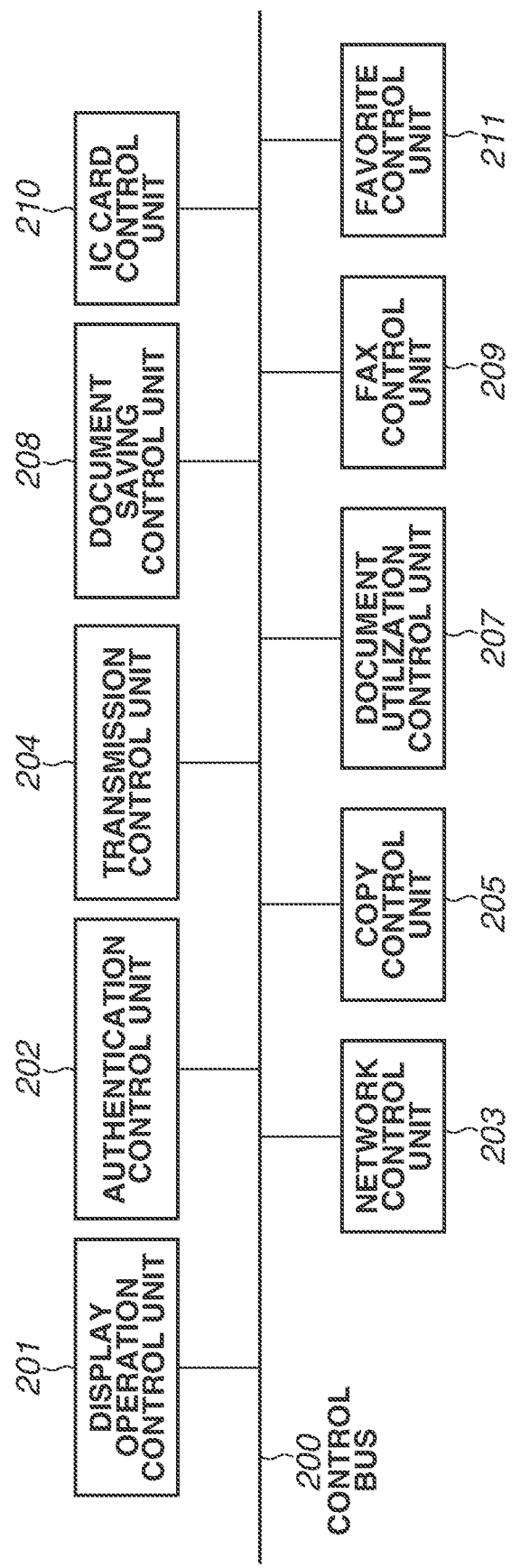
FIG. 2 is a block diagram illustrating a program configuration of the MFP according to the exemplary embodiment.

A software configuration of the MFP 101 will be described with reference to FIG. 2. The configuration in FIG. 2 is merely an example used for describing the present exemplary embodiment. Thus, it is needless to say that any configuration including another constituent element or having an effect similar to the effect achieved by the present exemplary embodiment can be applied thereto. A program that implements the respective control units illustrated in FIG. 2 is stored in the ROM 113, loaded into the RAM 112, and executed by the CPU 111 as necessary when the MFP 101 is activated or the function is used.

Control units such as a display operation control unit 201, an authentication control unit 202, and a network control unit 203 are connected to a control bus 200. Based on the control executed by the CPU 111, the control bus 200 receives and transmits information exchanged between the control units. For example, the control bus 200 receives instruction information input by the user from the display operation control unit 201 and temporarily stores the instruction information in the RAM 112. The display operation control unit 201 receives display information from the control units via the control bus 200 and displays the information on the display 119. The network control unit 203 executes processing for connecting the MFP 101 to the external device connected to the network 102 by using the communication I/F controller 117.

The MFP 101 has one or more functions such as copying and scanning, and has a control unit for each of the functions. In FIG. 2, a transmission control unit 204, a copy control unit 205, a document utilization control unit 207, a document saving control unit 208, and a fax control unit 209 are illustrated as the examples. Naturally, a function relating to the processing of the MFP 101 and different from the functions illustrated in FIG. 2 may exist, and a control unit corresponding to that function may also exist.

Based on the control executed by the CPU 111, the display operation control unit 201 controls the input control I/F 114 and the display control I/F 115. For example, the display operation control unit 201 displays information on the display 119 via the display control I/F 115 based on the instruction received from another control unit, and acquires information, which is input by the user to the touch panel 118 via the input control I/F 114. The display operation control unit 201 notifies the respective control units of the acquired information via the control bus 200 as necessary. In the below-described exemplary embodiment, it is assumed that information and data are exchanged between the control units via the control bus 200.

Based on the control executed by the CPU 111, the authentication control unit 202 executes authentication processing for identifying the user according to the information that is input by the user manually or using the IC card. For example, authentication succeeds if the input information has been previously registered in the system or the MFP 101 as information of the user of the MFP 101. Starting a session for a user who has succeeded in authentication through the authentication processing, is called "log-in".

Further, the authentication control unit 202 controls a user information database (not illustrated), which stores user information in the storage device 120. In addition to the user information database within the MFP 101, the authentication control unit 202 may use an authentication result by an external authentication server by connecting to the authentication server via the communication I/F controller 117. Further, ending the session for the user after the user has used the MFP 101 is called "log-out".

The transmission control unit 204 scans a document through the scanner 121 and converts the scanned document to data of a predetermined file format. The transmission control unit 204 transmits the document to a mail server connected to the network 102 via the network control unit 203 by using a of a mail protocol. A scan-and-send application is an example using the transmission control unit 204.

The copy control unit 205 scans a document through the scanner 121, executes specified processing such as stapling, and outputs the processed document through the printer 122. A copy application is an example using the copy control unit 205.

The document utilization control unit 207 prints or previews a document stored in an external file server, an HDD included in the MFP 101, a memory medium, or a cloud storage by using the MFP 101. When a document stored in the HDD of the MFP 101 or the memory medium is used, the document utilization control unit 207 accesses the storage device 120 via the storage device I/F 116 to acquire a specified document and executes the processing. When a document stored in an external file server or a storage provided on a cloud is used, the document utilization control unit 207 acquires the document from the storage destination on the network 102 via the network control unit 203 by using an appropriate protocol. When printing is executed, for example, the document utilization control unit 207 outputs the acquired document through the printer 122.

Similar to the transmission control unit 204, the document saving control unit 208 scans a document through the scanner 121 and converts the scanned document to data of a predetermined file format. The document saving control unit 208 saves, via the network control unit 203, the document file in a file server on the network 102 by using a communication protocol such as a server message block (SMB). The document file can also be saved in the HDD included in the MFP 101, a memory medium such as a universal serial bus (USB) memory, and a storage on the cloud in addition to the file server. When the document is to be saved in the HDD of the MFP 101 or a memory medium, the document saving control unit 208 accesses the storage device 120 via the storage device I/F 116 to save the document. When the document is to be saved in an external file server or a storage provided on the cloud, the document saving control unit 208 saves the document in the storage destination on the network 102 via the network control unit 203 by using an appropriate protocol. A scan-and-save application and a cloud application are examples using the document utilization control unit 207 and the document saving control unit 208.

The fax control unit 209 scans a document through the scanner 121 and converts the scanned document to data of an image format. The fax control unit 209 transmits the document to a transmission destination via the network control unit 203 through a public network or the internet by using a known fax transmission protocol such as G3. A fax application is an example using the transmission control unit 204.

The IC card control unit 210 accesses the IC card reading device 131 via the IC card control I/F 130 to read information of the IC card and returns a read result to a request-source control unit. A unique number specific to the IC card written in an IC chip is recorded as the IC card information. Hereinafter, this unique number is called "card ID".

The favorite control unit 211 manages setting of a favorite setting frequently used in the application such as the copy application described below, setting for calling the favorite setting from a home screen, and setting for associating the IC card with a favorite setting.

<Home Screen>

Figure 3:
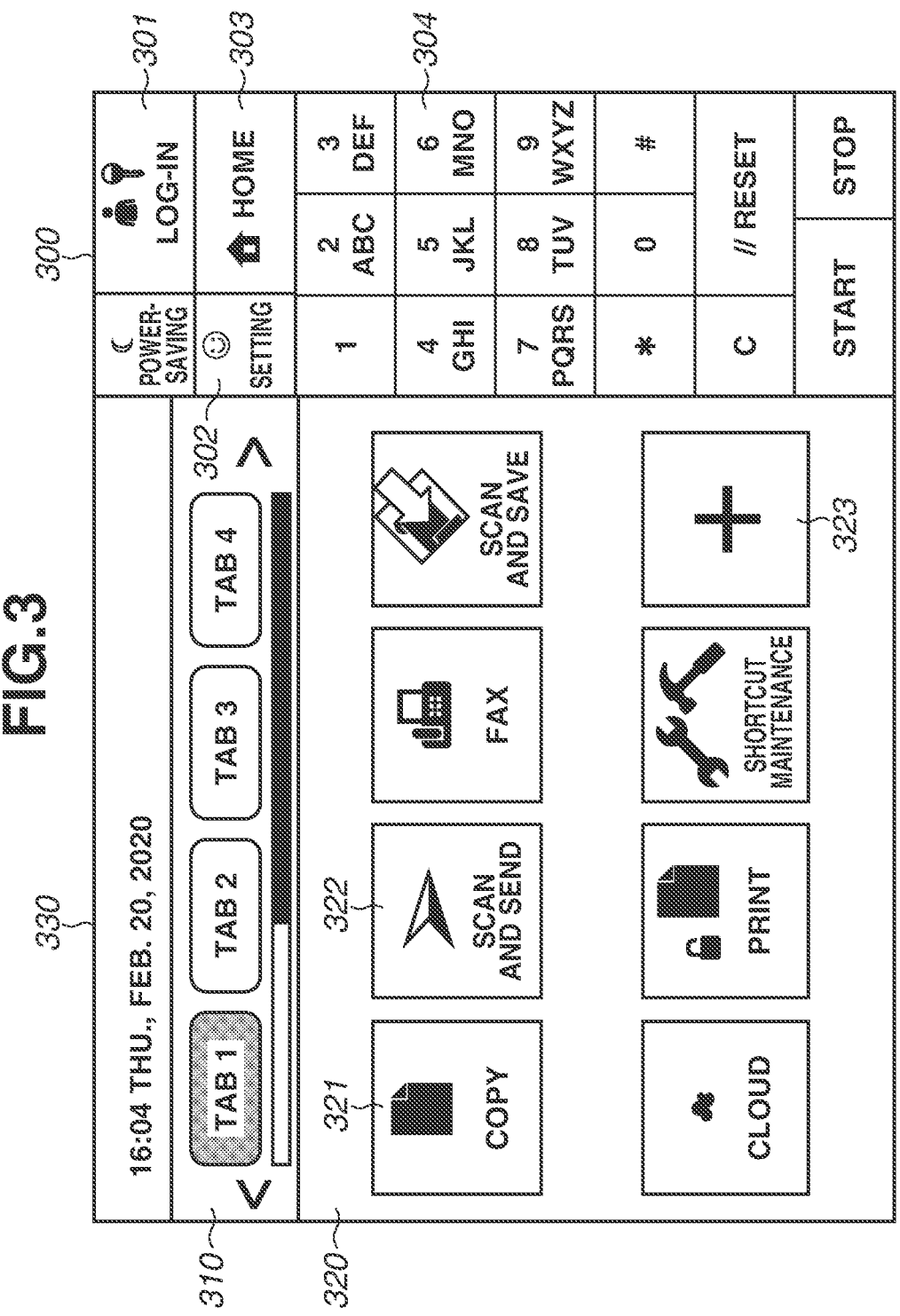
FIG. 3 is a diagram illustrating a home screen according to the exemplary embodiment.

FIG. 3 is a diagram illustrating an example of a home screen displayed on the display 119 of the MFP 101. The home screen is an initial screen displayed when the MFP 101 is used. The user can select and execute a function (application) and execute setting and authentication through the home screen.

The home screen consists of four areas, i.e., a control area 300, a tab area 310, a selection area 320, and an information area 330. The tab area 310, the selection area 320, and the information area 330 changes depending on the function (application) that is being executed, and the control area 300 is constantly displayed thereon regardless of the function that is being executed. A log-in button 301 for logging into the MFP 101, a setting button 302 for displaying a setting screen, and a home button 303 for bringing a function screen in execution back to the home screen are arranged in the control area 300. Further, buttons such as keypads 304 for inputting numerical values are arranged.

Tabs for switching the plurality of selection areas 320 are displayed in the tab area 310, and a screen corresponding to each of the tabs is displayed in the selection area 320. For example, FIG. 3 illustrates a state where a tab 1 is selected, and a screen corresponding to the tab 1 is displayed in the selection area 320. When another tab is selected, another screen (not illustrated) corresponding to that tab is displayed in another selection area 320.

Buttons for executing functions are arranged in the selection area 320. For example, as illustrated in FIG. 3, buttons such as a copy button 321 for executing a copy function and a scan-and-send button 322 for executing a scan-and-send function are arranged. When the user presses any one of these function execution buttons, an application screen corresponding to the function is displayed in an area consisting of the tab area 310 and the selection area 320. For example, a copy application screen is displayed when the copy function is executed, and a scan-and-send application screen is displayed when the scan-and-send function is executed. Further, in addition to the application screens, screens corresponding to respective functions are displayed in the area consisting of the tab area 310 and the selection area 320. For example, when the user presses a setting button 302, a setting screen (not illustrated) of the MFP 101 is displayed.

A plus (+) button 323 displayed in the selection area 320 represents a button with no function registered therein. A function of a new application installed on the MFP 101 can be added to a position where a symbol "+" is displayed in the selection area 320, and the shortcut described below can be registered therein.

As illustrated in the example in FIG. 3, the information area 330 is an area for notifying the user of information such as a current time. Further, an error message is also displayed thereon when an error occurs.

<Application Screen>

Figure 4:
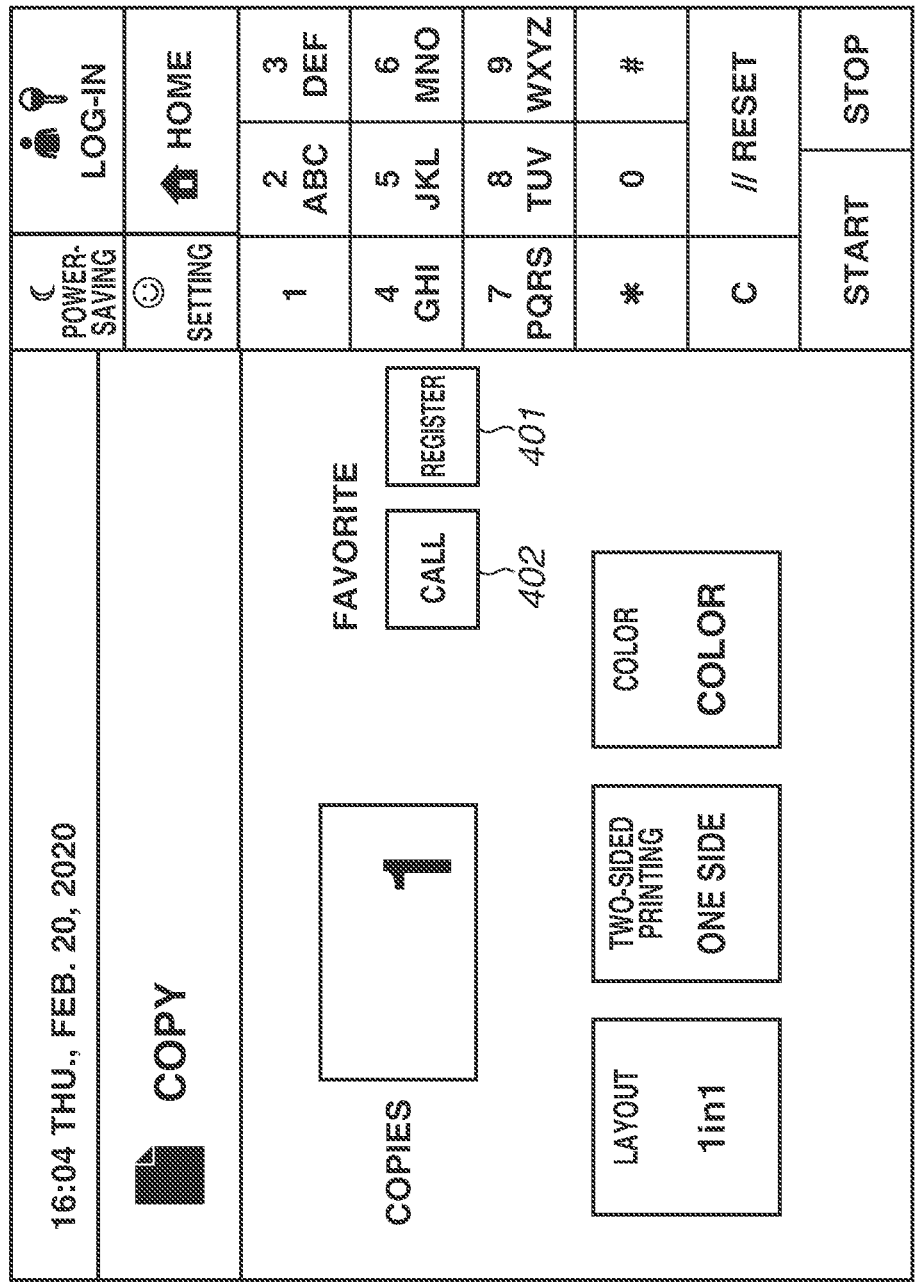
FIG. 4 is a diagram illustrating a copy screen according to the exemplary embodiment.

FIG. 4 is a diagram illustrating a display example of a copy screen for the copy application displayed when the copy button 321 is selected.

As illustrated in FIG. 4, the copy screen includes a number-of-copies setting button for specifying the number of printing copies and an imposition setting button for specifying the number of pages to be laid out in one sheet. The copy screen further includes a two-sided print setting button for specifying whether to execute printing on one side or two sides and a color setting button for specifying whether to execute printing in color, black and white, or gray scale. A current setting value is displayed on each of the setting buttons. When each of the setting buttons displayed on the application screen is pressed, a screen for changing a setting value corresponding to the pressed setting button is displayed, so that the user can change the setting, although this screen is not illustrated because it is not very important for the present exemplary embodiment.

Figure 5:
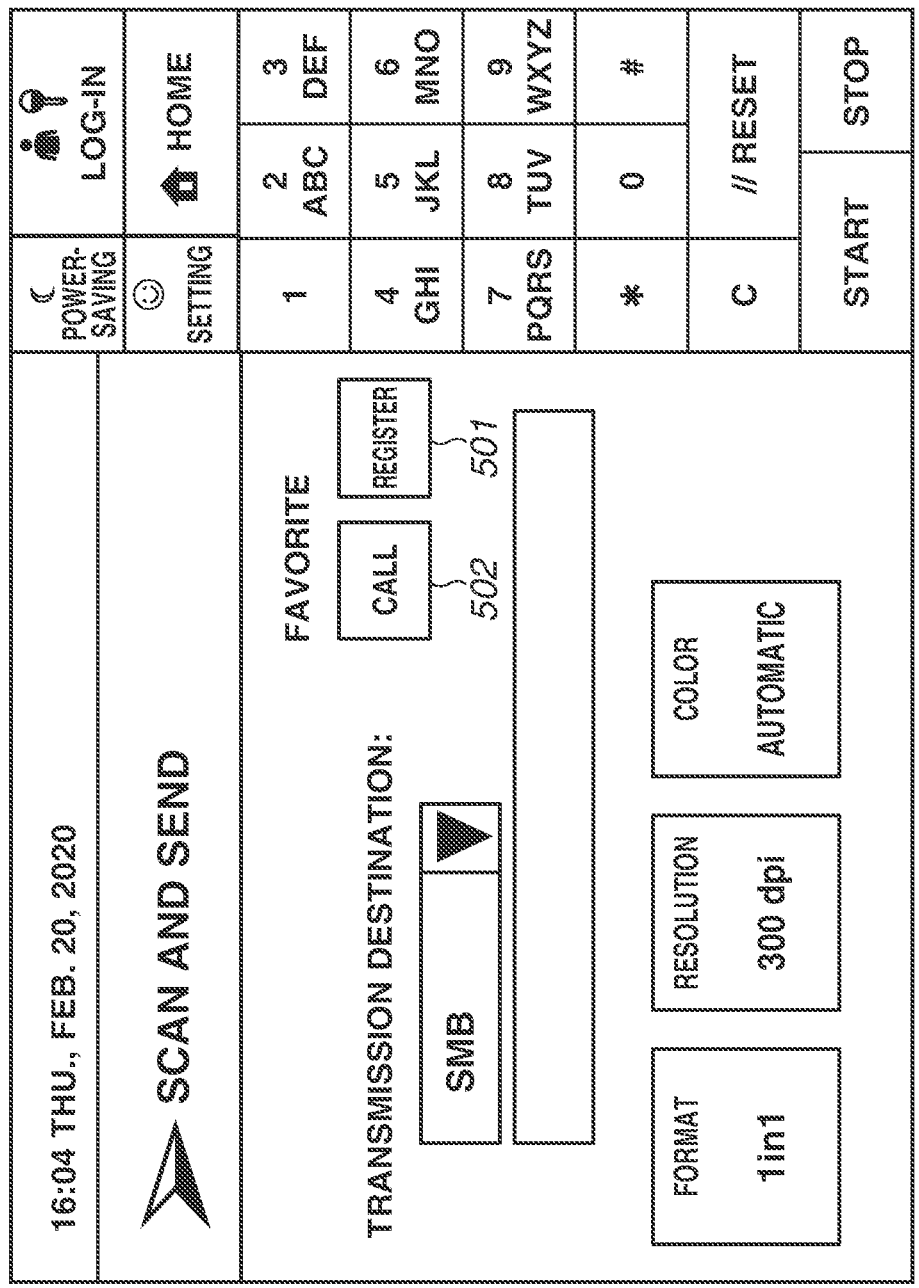
FIG. 5 is a diagram illustrating a scan-and-send screen according to the exemplary embodiment.

FIG. 5 is a diagram illustrating a display example of a scan-and-send screen for the scanning application displayed when the scan-and-send button 322 is selected.

As illustrated in FIG. 5, the scan-and-send screen includes a transmission destination setting button for setting a mail address or a path of a file server to which a scanned document is transmitted, a format setting button for specifying a format of saving a scanned document, and a resolution setting button for specifying a scanning resolution. The scan-and-send screen further includes a color setting button for specifying whether to read a document in color, black and white, or gray scale, or by automatic determination.

For the purpose of illustration, in FIGS. 4 and 5, application screens configured of simple constituent elements are illustrated as examples. However, the configuration is not limited thereto, and a setting other than the above-described settings can be executed, or not all of the above-described settings can be executed through the screens.

<Favorite Setting>

FIG. 6 is a diagram illustrating an example of a favorite management table for managing a favorite setting.

The favorite setting refers to a combination of a function (application) and a group of setting values frequently used in that function. In the favorite management table in FIG. 6, this combination is managed by using an identifier (ID). In a case where log-in is not prerequisite for using the MFP 101, this favorite setting allows one or more users to easily call the above-described favorite.

When a favorite registration button 401 or 501 is operated on the screen in FIG. 4 or 5, a group of setting values set and displayed at that time on the screen can be registered as a new favorite setting.

Further, when a favorite call button 402 or 502 is operated on the screen in FIG. 4 or 5, a favorite setting that has been already registered is called, and a group of setting values included in that favorite setting is reflected on the screen. When a plurality of favorite settings is registered in the function, the user manually selects an optional favorite setting therefrom.

For example, in a case where the user frequently uses "Imposition Setting: 2-in-1", "Two-Sided Print Setting: two sides", and "Color Setting: black and white" in the copy function to save printing sheets, "Number of Copies: 1", "Imposition Setting: 2-in-1", "Two-Sided Print Setting: two sides", and "Color Setting: black and white" are previously registered as a favorite setting. At this time, it is assumed that default settings of the copy function are "Number of Copies: 1", "Imposition Setting: 1-in-1", "Two-Sided Print Setting: one side", and "Color Setting: color". A default value is used as a setting value unless the user sets a value thereto. Thereafter, although the default values are displayed in the respective settings when the copy function is called, settings registered in the favorite setting are restored when the favorite setting is called. Therefore, the respective settings are changed to "Number of Copies: 1", "Imposition Setting: 2-in-1", "Two-Sided Print Setting: two sides", and "Color Setting: black and white". The user can execute copying with the settings always used by the user simply placing a document and pressing a start button.

For example, in a case where the scan-and-send function is always executed by the user with the transmission settings of "Format: jpeg", "Transmission Destination: SMB \\172.20.83.168\folder", and "Resolution: 400 dpi", the settings are registered as a favorite setting. At this time, it is assumed that default settings of the scan-and-send function are "Transmission Destination: blank", "Format: jpeg", "Resolution: 300 dpi", and "Color Setting: automatic determination". A default value is used as a setting value unless the user sets a value thereto. Thereafter, although the default values are displayed in the settings when the scan-and-send function is executed, settings registered in the favorite setting are restored when the favorite setting is called. Thus, the respective settings change to "Format: jpeg", "Transmission Destination: SMB \\172.20.83.168\folder", and "Resolution: 400 dpi". The user can transmit document data to a usual transmission destination with usual settings by simply placing a document and pressing a start button.

A plurality of favorite settings can be registered for each of the applications, so that a favorite setting can be selected therefrom. For example, "Imposition Setting: 4-in-1" used in the copy setting, which the user can further save printing sheets, may also be registered as a favorite in addition to "Imposition Setting: 2-in-1". When a plurality of favorites is registered, for example, the user may select a favorite from a list of favorites displayed when the favorite call button 402 is pressed.

FIG. 6 is a diagram illustrating a favorite management table for managing the information relating to the favorite setting. A unique identifier for identifying a registered favorite is stored in a favorite ID field 601. The favorite is a favorite of which function (application) is stored in a function field 602. A setting registered as a favorite is stored in a setting field 603.

A record 610 is an example of the above-described favorite setting of the copy function. An identifier "F0001"

is stored in the favorite ID field 601, a function name "Copy" is stored in the function field 602, and setting content "Number of Copies: 1, Imposition Setting: 2-in-1, Two-Sided Print Setting: two sides, Color Setting: black and white" is stored in the setting field 603. A record 611 is an example of the above-described favorite setting of the scan-and-send function. An identifier "F0005" is stored in the favorite ID field 601. A function name "Scan-and-Send" is stored in the function field 602, and setting content "Format: jpeg, Transmission Destination: file server \\172.20.83.168\folder, Resolution: 400 dpi, Color Setting: automatic" is stored in the function field 602.

<Shortcut>

A shortcut is a function used by the user when a favorite setting is called from the home screen displayed on the MFP 101. One or more shortcuts can be registered in the MFP 101.

A combination of a function (application) the user would like to call and a group of setting values of that function is registered in the shortcut. It is possible to register one favorite setting managed by the favorite management table in FIG. 6 with respect to one shortcut.

When a shortcut is selected from the home screen of the MFP 101, a function (application) registered for that shortcut is started, and an application screen is provided in a state where a group of setting values corresponding to the shortcut is applied thereto. When the user would like to newly register the shortcut, registration can be started by selecting the plus (+) button 323 from the home screen in FIG. 3.

An example of registering a shortcut of the copy function will be described with reference to FIGS. 7A and 7B.

Figure 7A:
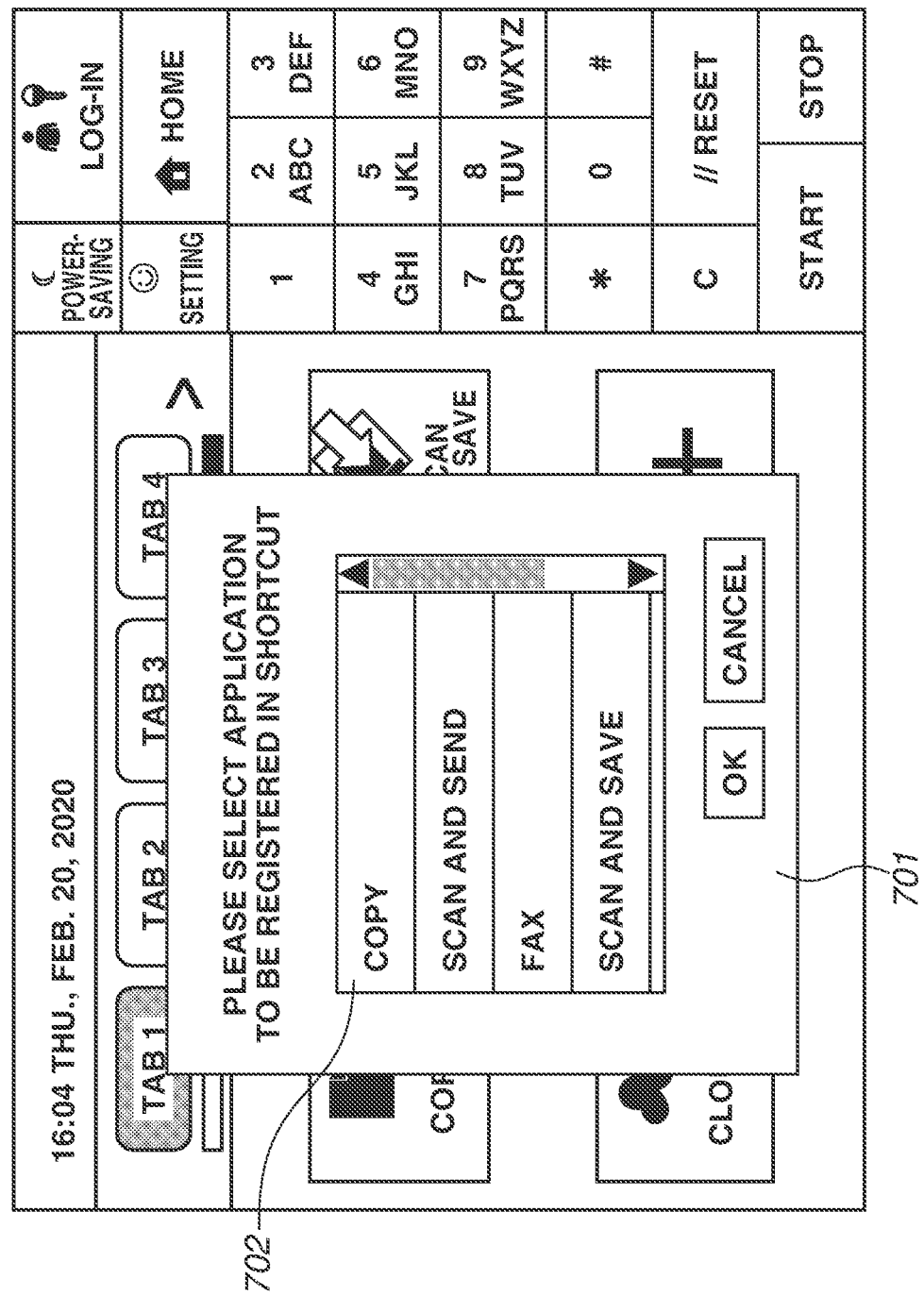

When the user operates the plus (+) button 323 on the home screen, a screen 701 illustrated in FIG. 7A is displayed. A list of applications installed in the MFP 101, which the user can use as the shortcuts, is illustrated on the screen 701. In this case, the user selects a copy 702 from the list and selects an OK button. With this operation, a shortcut relating to the copy function can be newly added.

When the screen is brought back to the home screen after registering the shortcut, a shortcut button 710 is added and displayed as illustrated in FIG. 7B. When the shortcut button 710 is operated, the copy function screen is displayed in a state where a group of setting values (e.g., optional favorite setting) associated therewith at the time of registering the shortcut is applied.

FIG. 8 is a diagram illustrating a shortcut management table for managing a shortcut.

A unique identifier for identifying a shortcut is stored in a shortcut ID field 601. A name of the application executed by the shortcut is stored in a function field 802. A value stored in the setting field 603 of the favorite management table in FIG. 6, which is to be reflected on the application, is stored in a called favorite field 803. A location where the shortcut is registered on the home screen is stored in a location field 804. A record 810 is an example of the registered shortcut of the copy function. A unique ID "S003" is stored in the shortcut ID field 801, and a function name "Copy" is stored in the function field 802. In the present exemplary embodiment, an application name is stored in the function field 802. However, for example, each of the applications may have a unique ID, and the unique ID may be stored in the function field 802. The favorite ID "F0001", which indicates a favorite described in the record 610 of the favorite management table in FIG. 6 is registered in the called favorite field 803. In the location field 804, "Tab 1: 8" indicating the 8th button of a tab 1 as a location of the shortcut button 710 of the home screen is stored.

A shortcut ID stored in the shortcut ID field 801, which corresponds to a called shortcut, is set to each of registered shortcut buttons displayed on the home screen. When the shortcut button displayed on the home screen is pressed, a shortcut ID set thereto is read out.

The application described in the function field 802 corresponding to the shortcut ID, read from the shortcut management table in FIG. 8 is executed. At the same time, the favorite ID recorded in the called favorite field 803 corresponding to the read shortcut ID is read out. Setting values recorded in the setting field 603, corresponding to the identifier recorded in the favorite ID field 601, are read from the favorite management table in FIG. 6 and applied to the application with the corresponding setting executed.

In the present exemplary embodiment, one favorite setting is stored with respect to one application. However, a plurality of favorite settings may be stored with respect to each of the applications. After selecting, from the list of applications displayed on the screen 701, an application desired by the user to register in the shortcut, a favorite list selection screen (not illustrated) is displayed if two or more favorite settings are registered with respect to that application. The user selects a desired favorite from the favorite list selection screen. In this way, the user can promptly use a desired application with a desired favorite setting by executing the shortcut on the home screen.

The shortcut in the present exemplary embodiment can be registered in association with the card information without depending on user information of the log-in user. For example, in addition to the IC card used for logging into the MFP 101, a user may have an optional card such as a transportation IC card. In this case, the shortcut may be registered in association with the card information of the transportation IC card, so that the user can easily call the shortcut without logging in. In this case, the user does not have to further register the user information in association with the shortcut.

With respect to the card information of the IC card used for logging into the MFP 101, registration of that card information can be restricted when the card information is registered in association with the shortcut. Further, in a case where an authentication function that uses the card information for logging into the MFP 101 is enabled, calling of the shortcut using the card information can be restricted. In this way, when the same card information is used for executing authentication and calling the shortcut, the IC card can be preferentially used as an authentication card in a case where the authentication function is enabled.

<Calling Shortcut Using IC Card>

If the IC card is previously registered in a shortcut, the user can execute the shortcut corresponding to the IC card by holding the IC card over the IC card reading device 131 when the home screen is displayed. For example, in a case where a registered shortcut is included in the selection area 320 corresponding to a tab not displayed on the display 119, the user can easily call the shortcut by simply holding the IC card over the IC card reading device 131 without performing switching operation of the tab.

An example of the processing for associating the card information with the shortcut button will be described with reference to FIGS. 9A and 9B. For example, a management screen is displayed when the shortcut button 710 displayed on the display 119 is selected. Through the management screen, the user can start executing processing for registering the card information in association with the shortcut or processing for deleting the association.

Figure 9B:
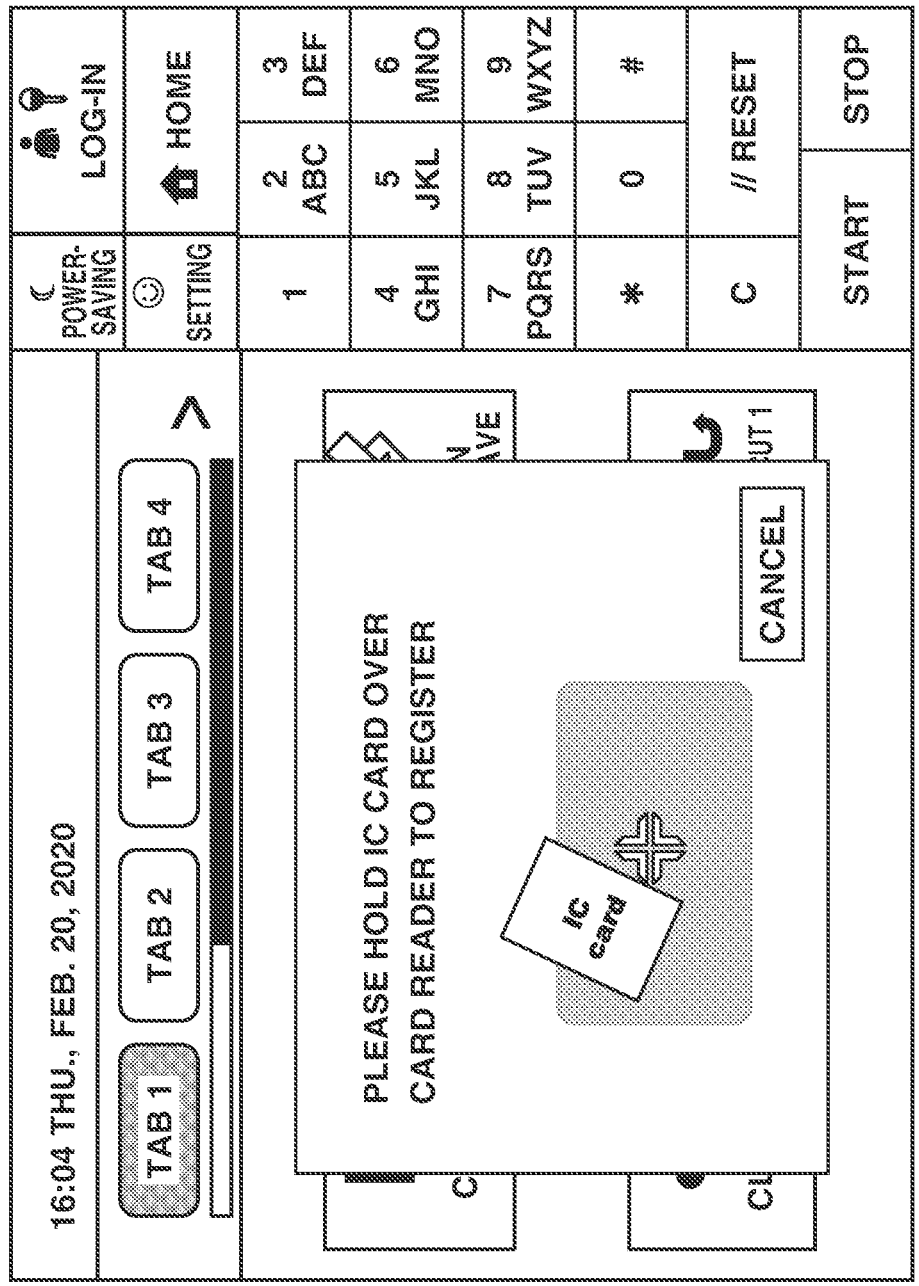

For example, when the user selects and presses the shortcut button 710 with a long time press, an IC card management screen 900 in FIG. 9A is displayed. The IC card management screen 900 includes an IC card registration button 901 and an IC card deletion button 902. An IC card registration screen in FIG. 9B is displayed when the IC card registration button 901 is pressed. When the user holds the IC card over the IC card reading device 131, card information of the IC card is read, and a card ID included in the card information is registered in the shortcut. For example, card information such as a manufacturing number or a card ID can be used. Alternatively, unique information readable from the IC card can be used.

When the IC card deletion button 902 is pressed, the card ID of the IC card registered in the shortcut is deleted.

FIG. 10 is a diagram illustrating a card information management table for managing the association of the card information and the shortcut. Unique card information recorded in a registration-target IC card is stored in a card ID field 1001. A shortcut ID of the shortcut called corresponding to the IC card is stored in a shortcut ID field 1002. An execution date of registering the IC card in the shortcut is stored in a registration date field 1003.

In the present exemplary embodiment, as illustrated by a record 1010 and a record 1011 in FIG. 10, a plurality of pieces of card information can be registered in association with a single shortcut (shortcut ID S001).

A card ID of the IC card is read out when the IC card is held over the IC card reading device 131 at the time of the home screen, so that the favorite control unit 211 checks whether the card ID exists in the card ID field 1001 of the card information management table in FIG. 10. If the card ID exists, the shortcut ID corresponding to the card ID is read from the shortcut ID field 1002, and the shortcut specified by the shortcut ID is executed as described above.

A record 1010 is an example of a record recorded in the shortcut management table in which card information of one IC card is registered in the shortcut button 710. It is assumed that the card ID of the IC card held over the IC card reading device 131 at the time of the IC card registration screen in FIG. 9B is "03BAF394AE277C80". The card ID "03BAF394AE277C80" is stored in the card ID field 1001, and the shortcut ID "S001" registered in the shortcut button 710 is stored in the shortcut ID field 1002.

Further, a record 1011 is an example of a record recorded when card information of a second IC card is registered in the same shortcut. It is assumed that the card ID of the second IC card is "02GFG434DF155D21". The card ID "02GFG434DF155D21" is stored in the card ID field 1001, and the shortcut ID "S001" is stored in the shortcut ID field 1002.

<Registering Plurality of IC Cards in Shortcut>

Although a plurality of IC cards can be registered in a shortcut, there is a limitation in the number of IC cards registrable in one shortcut. The number of pieces of registrable card information has an upper limit. Control executed when the number of registrations exceeds the upper limit when the IC card is registered in the shortcut will be described with reference to FIGS. 11 to 14. In addition, the MFP 101 may execute only one of the pieces of processing illustrated in FIGS. 11 to 14. Further, some of the pieces of processing in FIGS. 11 to 14 can be switched depending on the setting previously executed on the main body, or can automatically be switched depending on a desired condition.

Figure 11:
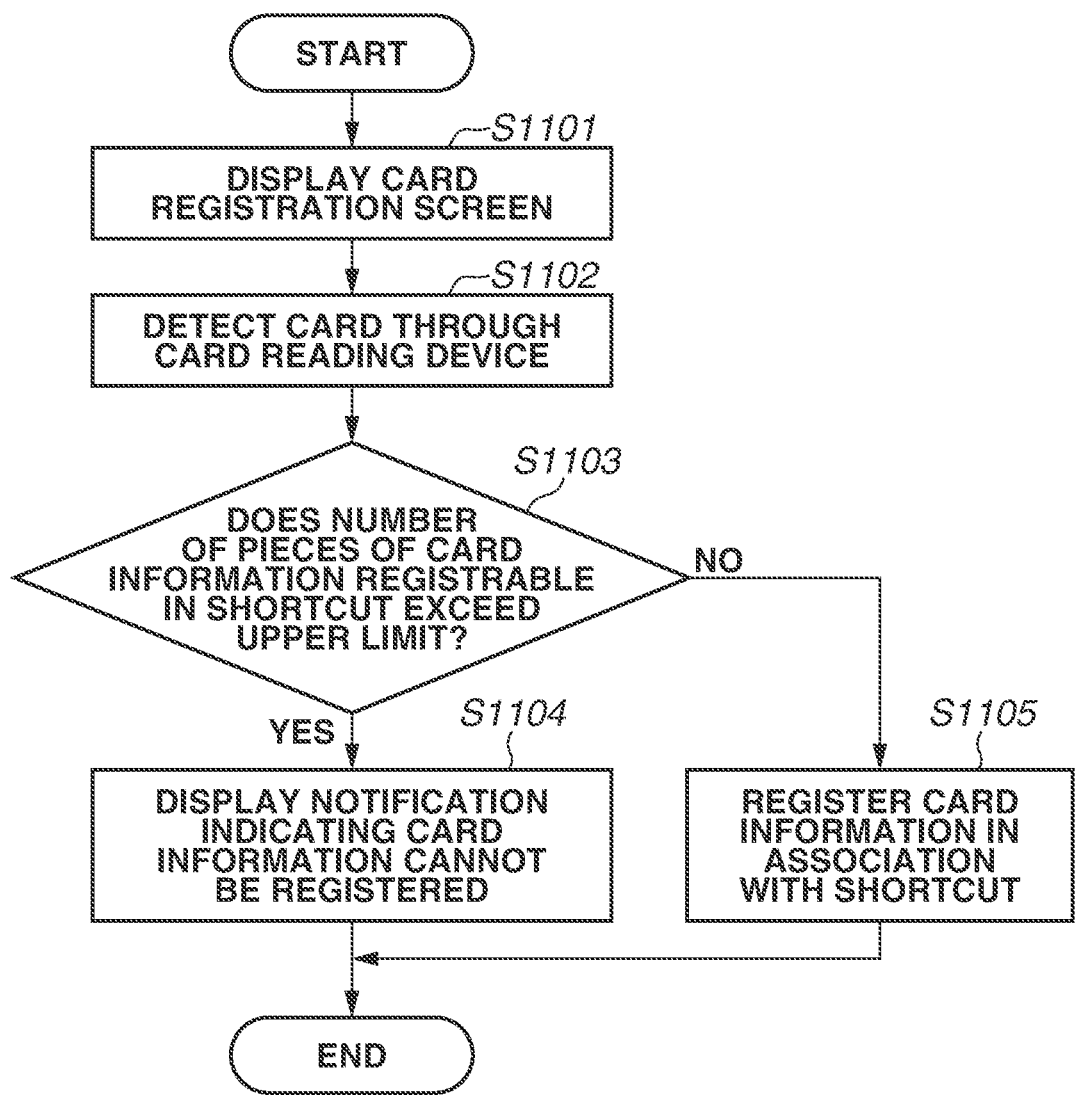
FIG. 11 is a flowchart illustrating first card information registration processing according to one embodiment.

FIG. 11 is a flowchart illustrating first card information registration processing in the MFP 101. When the number of registrations has exceeded the upper limit, management is executed by giving a priority to the information of the IC card registered earlier over the information of the IC card registered later.

In step S1101, the display operation control unit 201 displays an IC card registration screen with respect to one shortcut on the display 119. In step S1102, the IC card control unit 210 detects the IC card held over the IC card reading device 131. In step S1103, the favorite control unit 211 checks whether the number of pieces of card information registrable in that shortcut exceeds the upper limit. In a case where the number thereof exceeds the upper limit in step S1103 (YES in step S1103), the processing proceeds to step S1104. In step S1104, the display operation control unit 201 notifies the user that the IC card cannot be registered via the display 119.

In a case where the number thereof does not exceed the upper limit in step S1103 (NO in step S1103), the processing proceeds to step S1105. In step S1105, the favorite control unit 212, in order to associate the IC card held over the IC card reading device 131 with the shortcut, registers the card information in the IC card management table illustrated in FIG. 10 in association with the shortcut ID of the shortcut.

Figure 12:
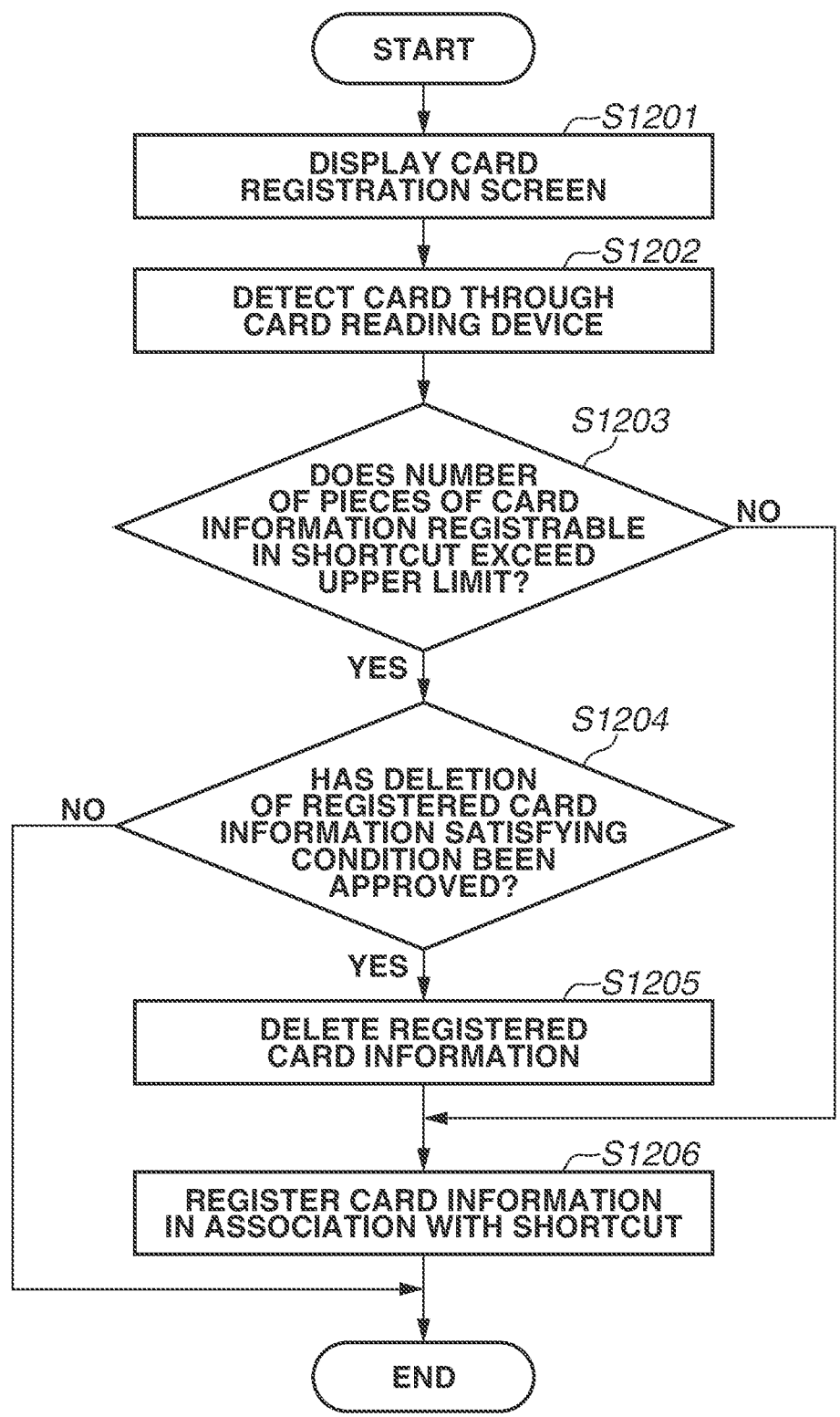
FIG. 12 is a flowchart illustrating second card information registration processing according to one embodiment.

FIG. 12 is a flowchart illustrating second card information registration processing executed in the MFP 101. In a case where the number of pieces of card information registrable in one shortcut exceeds the upper limit, card information to be deleted is determined based on a condition. For example, card information as a deletion candidate is determined based on a condition, e.g., "a date of registration is older" or "the longest time has passed since the last date of use". In the exemplary embodiment, the card information satisfying a condition "a date of registration is older" is deleted. In addition, the processing in steps S1201 to S1203 and S1206 is similar to the processing in steps S1101 to S1103 and S1105, so that description thereof will be omitted.

In a case where the upper limit is exceeded in step S1203 (YES in step S1203), the favorite control unit 211 specifies the card information having the oldest registration data from among the pieces of card information registered in the shortcut as a target in step S1201. Then, in step S1204, the favorite control unit 211 inquires of the user about deletion of the card information and confirms whether deletion thereof has been approved. This confirmation is executed by detecting an operation of approval executed by the user in response to the notification displayed on the display 119 by the display operation control unit 201. In step S1204, if the user has approved the deletion (YES in step S1204), the processing proceeds to step S1205. In step S1205, the favorite control unit 211 deletes the specified card information. In step S1204, if the user does not approve the deletion (NO in step S1204), the processing is ended without registering the new card information.

In a case where the card information as a deletion candidate is determined based on the condition that the longest time has passed since the last date of use, a column describing the date of use is added to the table in FIG. 10, and the information about the date of use is updated every time the shortcut is called by the card information.

Figure 13:
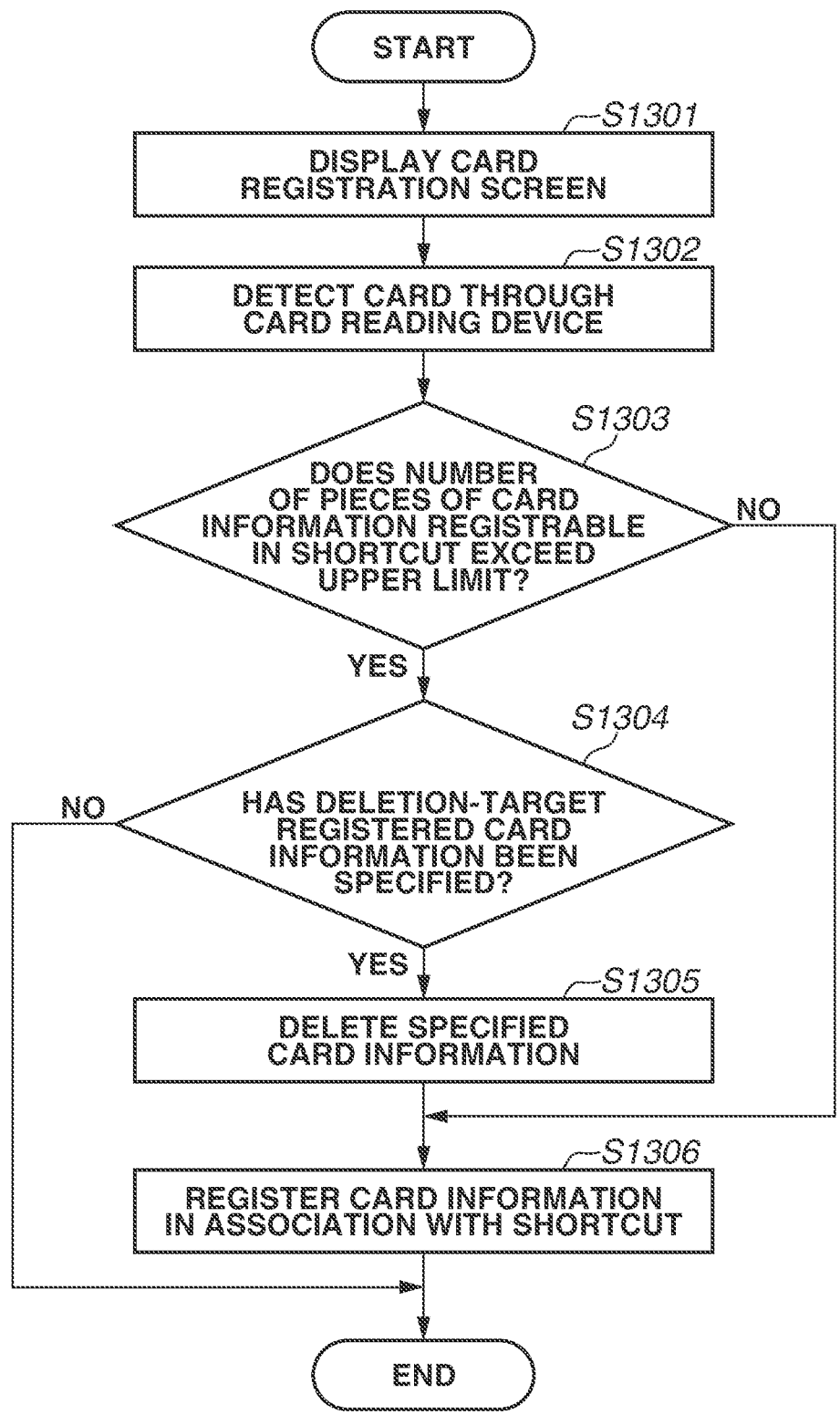
FIG. 13 is a flowchart illustrating third card information registration processing according to one embodiment.

FIG. 13 is a flowchart illustrating third card information registration processing in the MFP 101. In a case where the number of pieces of card information registrable in one shortcut exceeds the upper limit, registration of optional card information is deleted. In addition, the processing in steps S1301 to S1303 and S1306 is similar to the processing in steps S1101 to S1103 and S1105, so that description thereof will be omitted.

In a case where the upper limit is exceeded in step S1303 (YES in step S1303), the processing proceeds to step S1304. In step S1304, the favorite control unit 211 determines whether card information that is permitted to be deleted has been specified from among the pieces of card information registered in the shortcut as a target in step S1301. When the above determination is executed, the display operation control unit 201 displays a list of card information on the display 119 to detect a card-selection operation executed by the user. Then, the favorite control unit 211 determines that specification is accepted based on the detection. In step S1304, if the card information to be deleted is specified (YES in step S1304), the processing proceeds to step S1305. In step S1305, the favorite control unit 211 deletes the specified card information. In step S1304, if the card information to be deleted is not specified (NO in step S1304), this processing is ended without registering the new card information.

Figure 14:
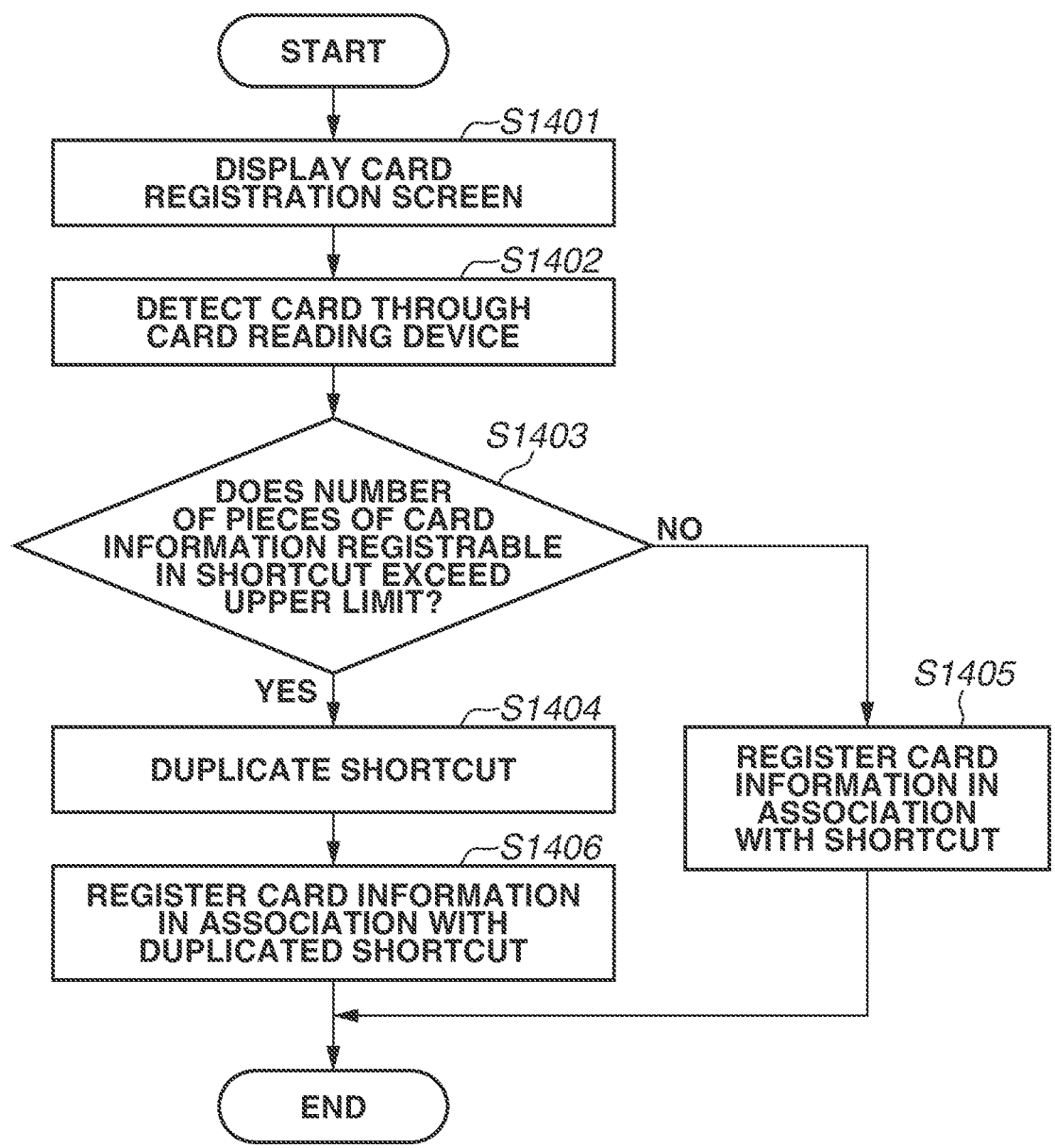
FIG. 14 is a flowchart illustrating fourth card information registration processing according to one embodiment.

FIG. 14 is a flowchart illustrating a fourth card information registration processing executed in the MFP 101. When the number of registrations exceeds the upper limit, the IC card is registered in a duplicated shortcut. In addition, the processing in steps S1401 to S1403 and S1405 is similar to the processing in steps S1101 to S1103 and S1105, so that description thereof will be omitted.

In a case where the upper limit is exceeded in step S1403 (YES in step S1403), the processing proceeds to step S1404. In step S1404, the favorite control unit 211 duplicates the shortcut as a target in step S1401. More specifically, the favorite control unit 211 adds a record having a new shortcut ID and new location information with the same value of function and the same value of called favorite to the table illustrated in FIG. 8. Then, in step S1406, the favorite control unit 211 registers the card information of the IC card that is held over the IC card reading device 131 in step S1402 in association with the duplicated shortcut. In this case, the favorite control unit 211 adds a record of a shortcut ID of the duplicated shortcut to the IC card management table illustrated in FIG. 10, and registers the card information in that record.

<Shortcut Editing Processing>

When a plurality of pieces of card information is registered in association with one shortcut, the shortcut is likely to be shared by different users. Thus, when the content of the favorite setting (i.e., at least any one of the setting values stored in the setting field 603) associated with the shortcut is to be edited, control considered to be used in a shared manner has to be executed. The control considered to be used in a shared manner, executed in the editing processing of the shortcut, will be described with reference to FIGS. 15 to 20. In addition, the MFP 101 may execute only one of the pieces of processing illustrated in FIGS. 15 to 20. Further, some of the pieces of processing in FIGS. 15 to 20 can be switched depending on a setting previously executed on the main body, or can automatically be switched depending on a desired condition.

Figure 15:
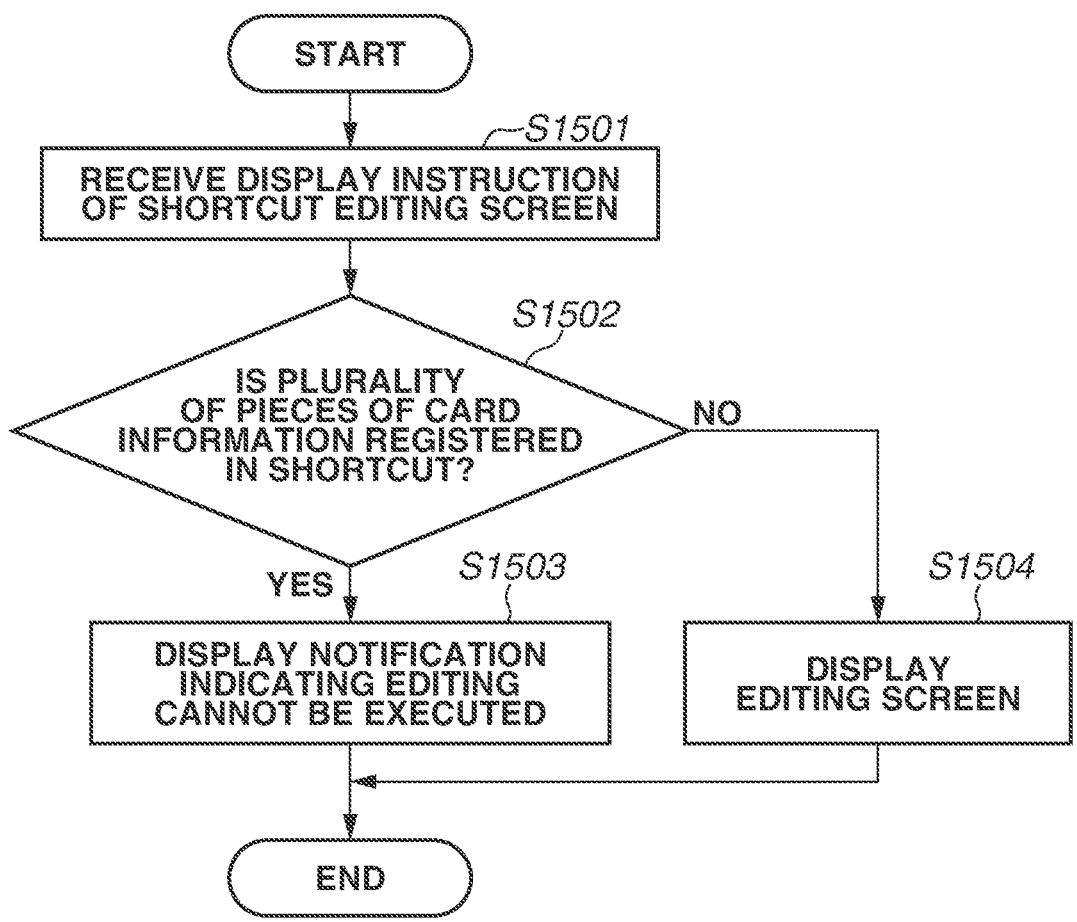
FIG. 15 is a flowchart illustrating first shortcut editing processing according to one embodiment.

FIG. 15 is a flowchart illustrating first shortcut editing processing executed in the MFP 101. In this processing, in a case where a plurality or pieces of card information is registered in association with a shortcut specified as an editing target, control is executed so that editing of the content of the favorite setting associated with that shortcut is prohibited.

In step S1501, the favorite control unit 211 accepts a display instruction of a shortcut editing screen of a shortcut selected and specified by the user. This instruction is accepted based on a user input performed via the display 119.

In step S1502, the favorite control unit 211 determines whether a plurality of pieces (two or more pieces) of card information is registered in association with the specified shortcut.

In step S1502, if a plurality of pieces of card information is registered (YES in step S1502), the processing proceeds to step S1503. In step S1503, the display operation control unit 201 notifies the user that editing of the shortcut cannot be executed. In step S1502, if a plurality of pieces of card information is not registered (NO in step S1502), the processing proceeds to step S1504. In step S1504, the display operation control unit 201 displays a screen for editing the content of the favorite setting associated with the shortcut. On the setting screen displayed in step S1504, a setting of a display location of the shortcut and a setting for promptly executing a function with a favorite setting associated with the shortcut without asking a user confirmation can also be edited.

Figure 16:
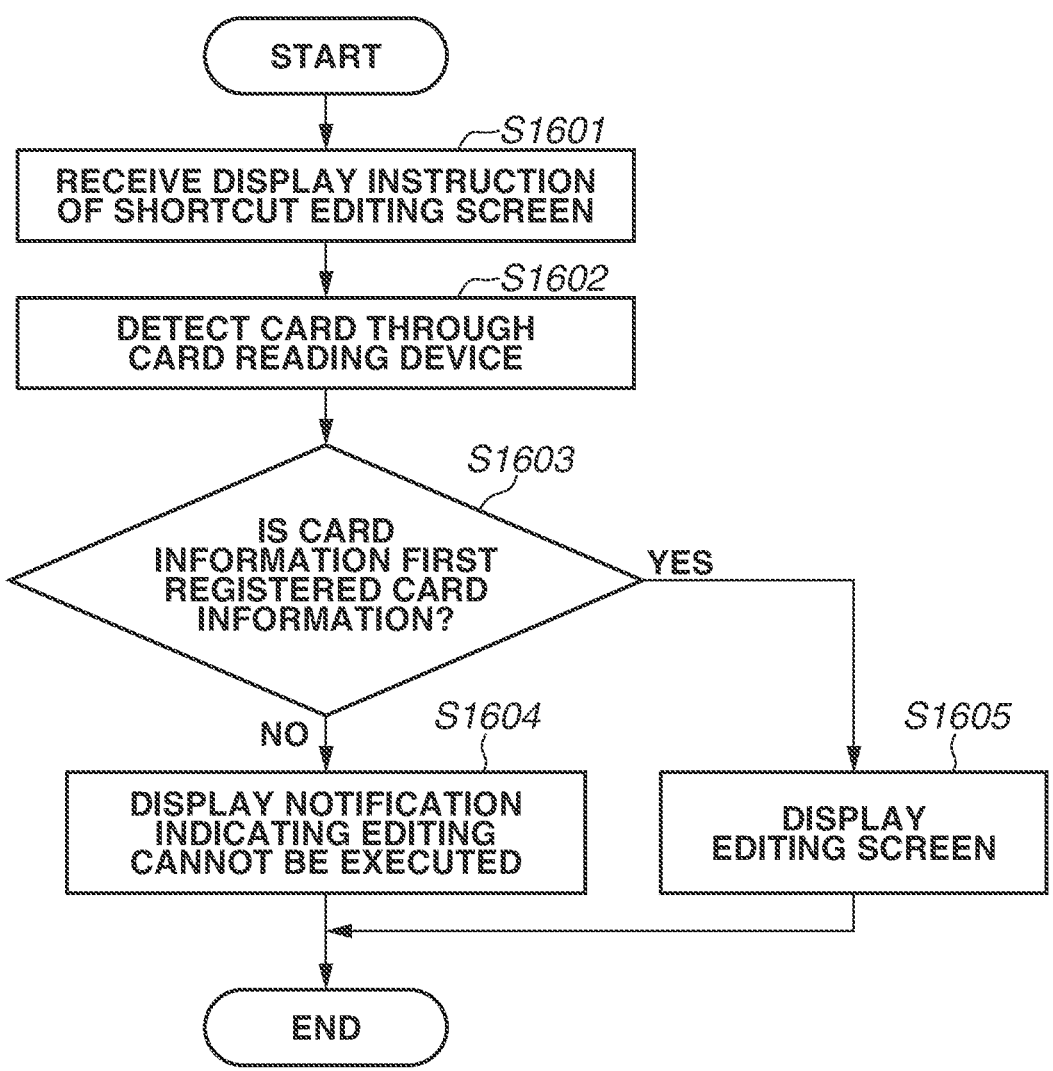
FIG. 16 is a flowchart illustrating second shortcut editing processing according to one embodiment.

FIG. 16 is a flowchart illustrating second shortcut editing processing executed in the MFP 101. In a case where a shortcut is edited, control is executed so that editing is permitted only when the IC card held over the IC card reading device 131 by the user is an IC card corresponding to the first card information registered in that shortcut. In addition, the processing in steps S1601, S1604 and S1605 is similar to the processing in steps S1501, S1503 and S1504, so that description thereof will be omitted.

In step S1602, the IC card control unit 210 detects the IC card held over the IC card reading device 131. In step S1603, the favorite control unit 211 refers to the table in FIG. 10 and determines whether the card information of the IC card detected in step S1602 is the first card information registered in that shortcut. If the card information is the first registered card information in step S1603 (YES in step S1603), the processing proceeds to step S1605. If the card information is not the first registered card information (NO in step S1603), the processing proceeds to step S1604.

Figure 17:
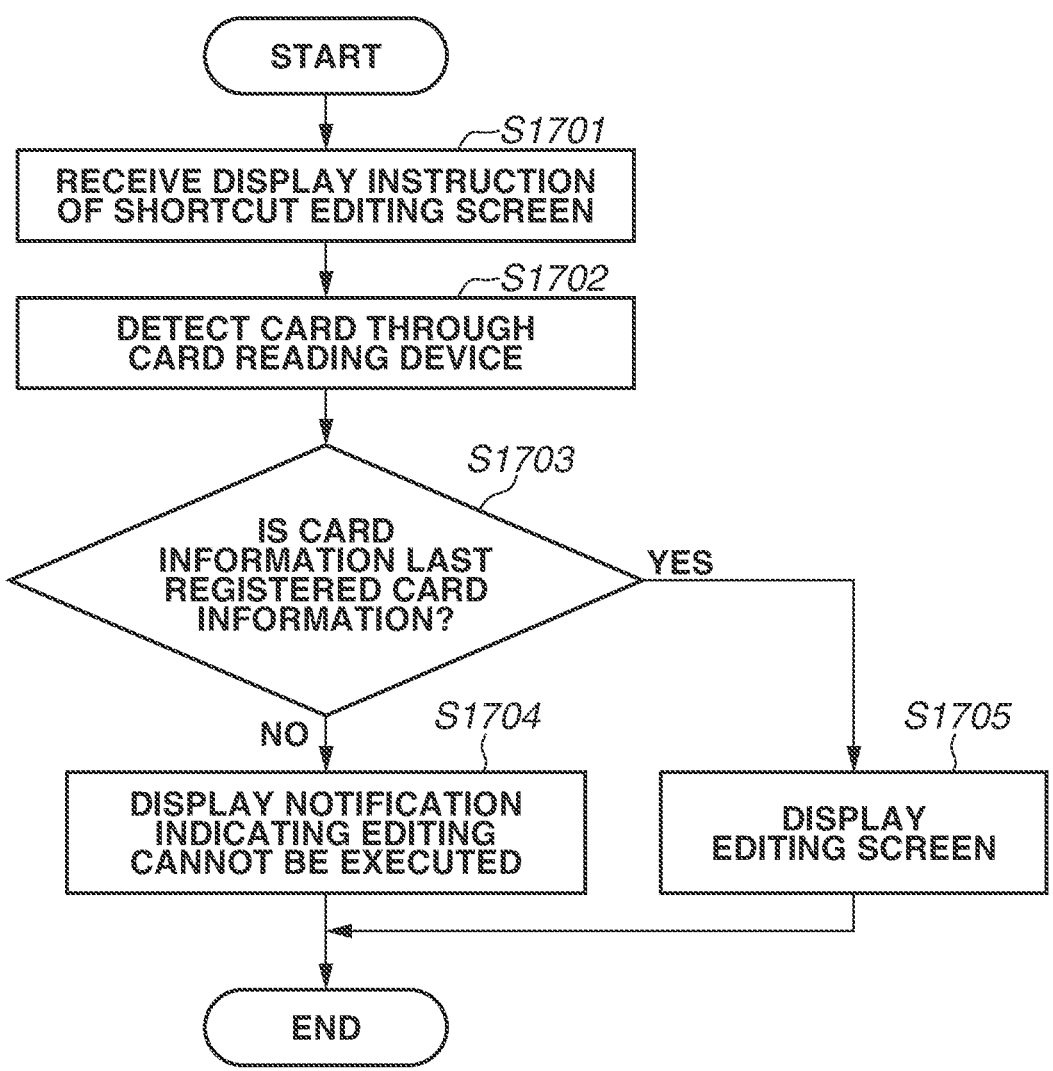
FIG. 17 is a flowchart illustrating third shortcut editing processing according to one embodiment.

FIG. 17 is a flowchart illustrating third shortcut editing processing executed in the MFP 101. In a case where a shortcut is edited, control is executed so that editing is permitted only when the IC card held over the IC card reading device 131 by the user is an IC card corresponding to the last card information registered in that shortcut. The editing is permitted based on the assumption that a user who has the last registered IC card is highly likely to use the shortcut shortly thereafter. In addition, the processing in steps S1701, S1702, S1704, and S1705 is similar to the processing in steps S1601, S1602, S1604, and S1605, so that description thereof will be omitted.

In step S1703, the favorite control unit 211 refers to the table illustrated in FIG. 10 to determine whether the card information of the IC card detected in step S1702 is the last card information registered in that shortcut. In step S1703, if the card information is the last registered card information (YES in step S1703), the processing proceeds to step S1705. If the card information is not the last registered card information (NO in step S1703), the processing proceeds to step S1704.

Figure 18:
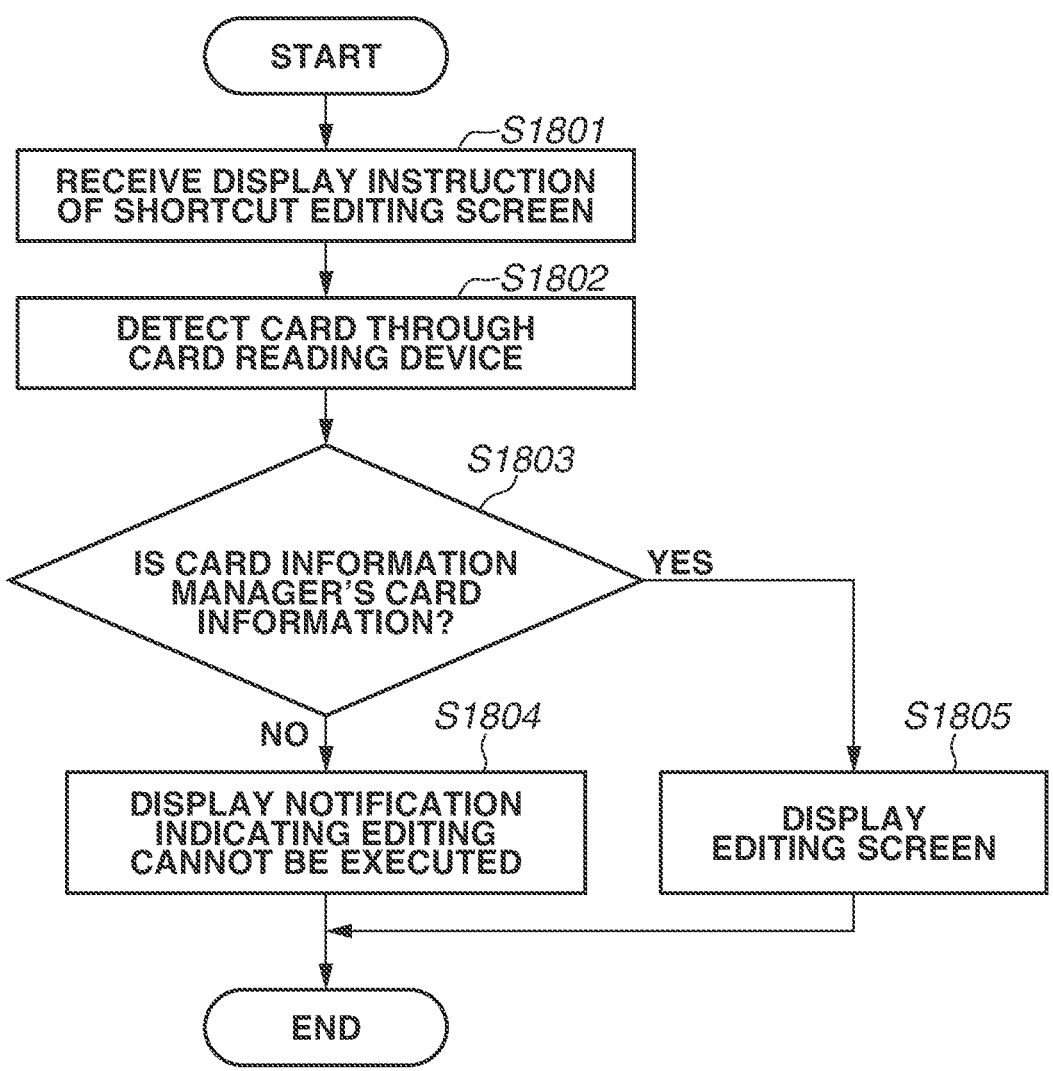
FIG. 18 is a flowchart illustrating fourth shortcut editing processing according to one embodiment.

FIG. 18 is a flowchart illustrating fourth shortcut editing processing executed in the MFP 101. In a case where a shortcut is edited, control is executed so that editing is permitted only when the IC card held over the IC card reading device 131 by the user is an IC card prepared for a manager of the shortcut. This control is executed based on a precondition that card information of a specific IC card is previously registered as manager's information in a table (not illustrated). In addition, the processing in steps S1801, S1802, S1804, and S1805 is similar to the processing in steps S1601, S1602, S1604, and S1605, so that description thereof will be omitted.

In step S1803, the favorite control unit 211 determines whether the card information of the IC card detected in step S1802 is the manager's card information. In step S1803, if the card information is the manager's card information (YES in step S1803), the processing proceeds to step S1805. If the card information is not the manager's card information (NO in step S1803), the processing proceeds to step S1804.

Figure 19:
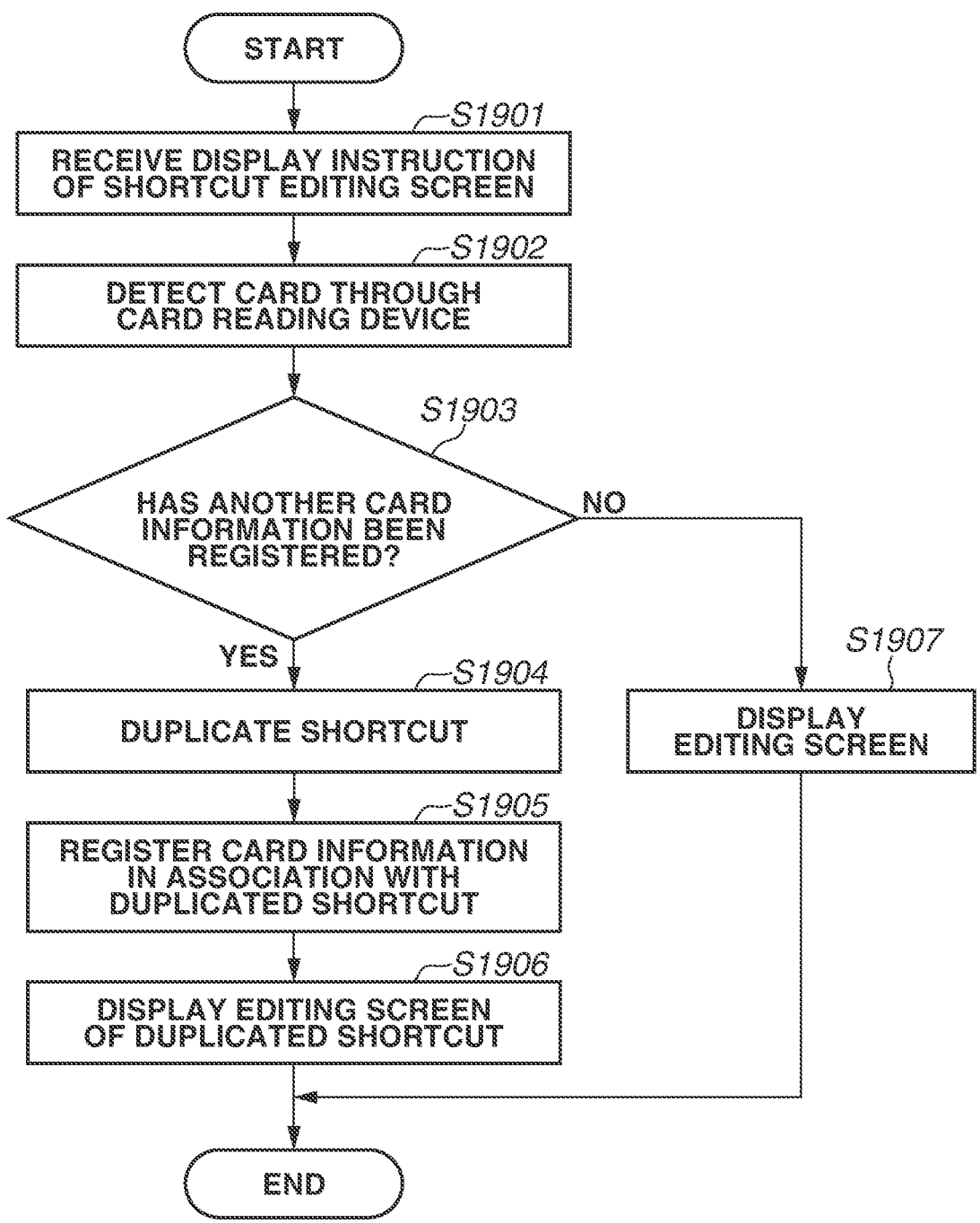
FIG. 19 is a flowchart illustrating fifth shortcut editing processing according to one embodiment.

FIG. 19 is a flowchart illustrating fifth shortcut editing processing executed in the MFP 101. In a case where another IC card has already been registered in a shortcut when the shortcut is to be edited, control is executed so that editing is executed after creating a duplicate of the shortcut. In addition, the processing in steps S1901, S1902, and S1907 is similar to the processing in steps S1601, S1602, and S1605, so that description thereof will be omitted.

In step S1903, the favorite control unit 211 determines whether card information different from the card information of the IC card detected in step S1902 has already been registered in the specified shortcut. In step S1903, if different card information has already been registered (YES in step S1903), the processing proceeds to step S1904. If different card information is not registered (NO in step S1903), the processing proceeds to step S1907.

In step S1904, the favorite control unit 211 duplicates the shortcut as a target in step S1901. More specifically, the favorite control unit 211 adds a record having a new shortcut ID and new location information with the same value function and the same value of the called favorite to the table illustrated in FIG. 8. Then, in step S1905, the favorite control unit 211 registers the card information of the IC card held over the IC card reading device 131 in step S1902 in association with the duplicated shortcut. In this case, the favorite control unit 211 adds a record of a shortcut ID of the duplicated shortcut to the IC card management table illustrated in FIG. 10, and registers the card information in that record.

In step S1906, the display operation control unit 201 displays a screen for editing the content of the favorite setting associated with the duplicated shortcut. On the setting screen displayed in step S1906, a setting of a display location of the shortcut and a setting for promptly executing a function with a favorite setting associated with the shortcut without asking user confirmation can also be edited.

Figure 20:
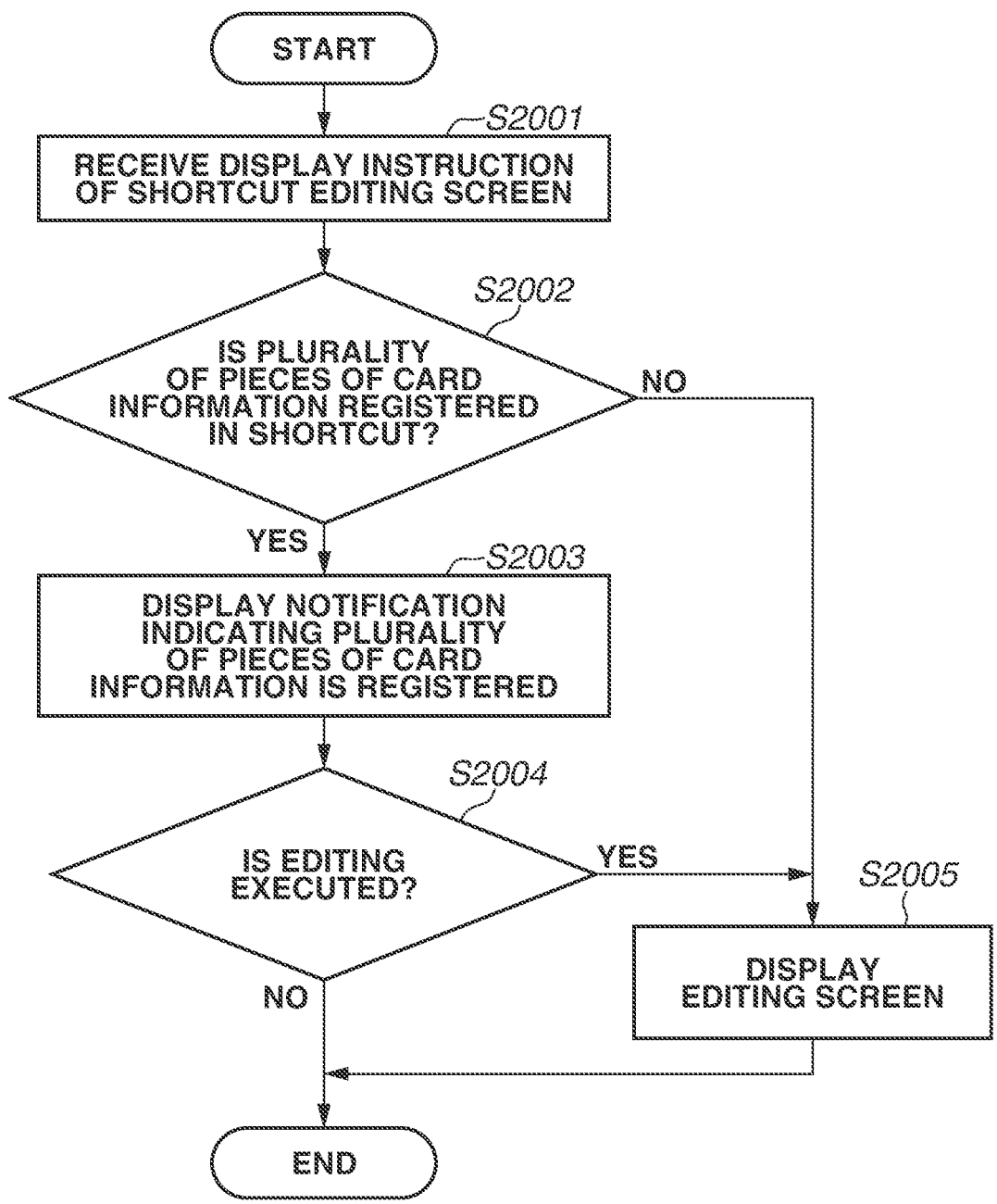
FIG. 20 is a flowchart illustrating sixth shortcut editing processing according to one embodiment.

FIG. 20 is a flowchart illustrating sixth shortcut editing processing executed in the MFP 101. In a case where a plurality of IC cards is registered in a shortcut when the shortcut is to be edited, control is executed so that the user is entrusted to determine whether to execute editing processing. In addition, the processing in steps S2001, S2002, and S2005 is similar to the processing in steps S1501, S1502, and S1504, so that description thereof will be omitted.

In step S2003, the display operation control unit 201 displays, by using the display 119, a notification indicating a plurality of pieces of card information is registered in the specified shortcut. Further, in response to this display, an instruction indicating whether to edit the shortcut is received from the user. In step S2004, if editing is executed (YES in step S2004), the processing proceeds to step S2005. If editing is not executed (NO in step S2004), this processing is ended without editing the shortcut.

<Processing Executed when Shortcut is Called>

When a shortcut is used, there is a possibility that content of a favorite setting associated with the shortcut has been edited and updated by another user.

Figure 21:
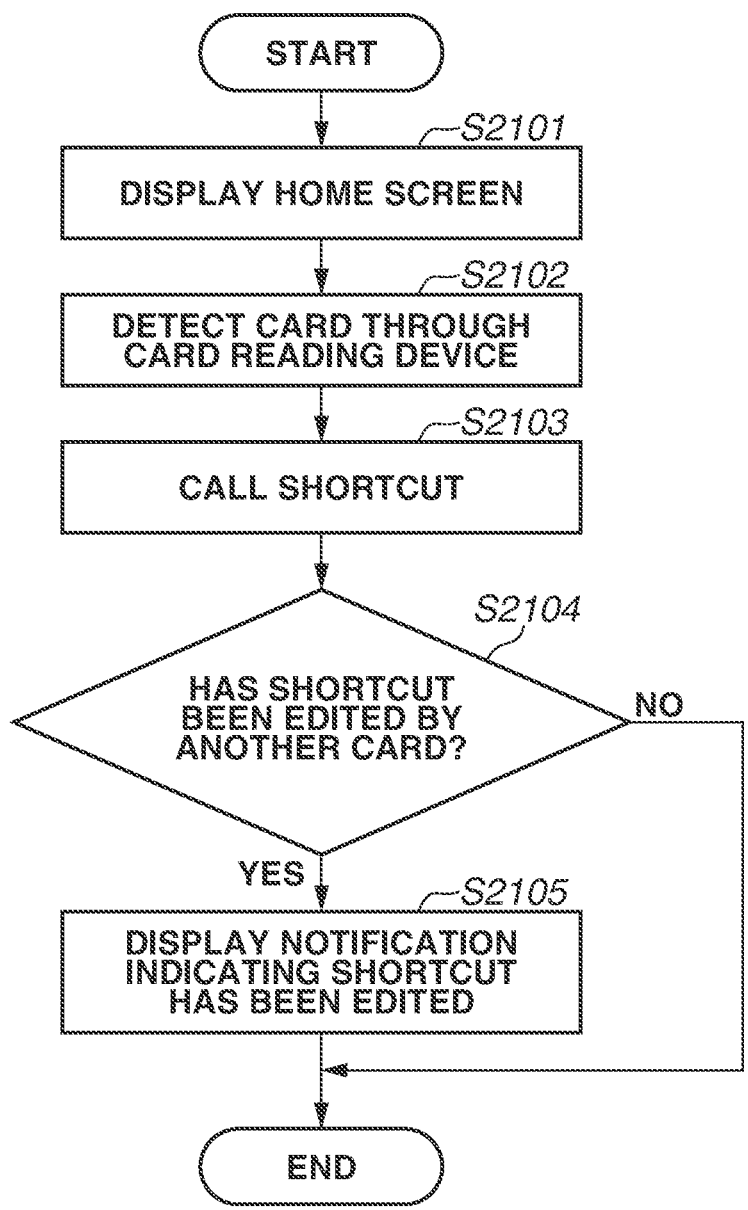
FIG. 21 is a flowchart illustrating processing executed when shortcut is called according to one embodiment.

The processing for detecting whether a shortcut has been edited and updated, executed when the shortcut is called, will be described with reference to FIG. 21.

This processing is executed based on the premise that a shortcut becomes editable when the user holds an IC card over the IC card reading device 131, and that the table in FIG. 8 is expanded so that a date and time of edit and card information of the IC card can be further recorded in association with the shortcut when editing is completed.

In step S2101, the display operation control unit 201 displays the home screen illustrated in FIG. 3. In step S2102, the IC card control unit 210 detects the IC card held over the IC card reading device 131. In step S2103, the favorite control unit 211 calls a shortcut associated with the card information of the IC card held over the IC card reading device 131 in step S2102. In this case, the favorite control unit 211 refers to the table in FIG. 10 and reads a value recorded in the called favorite field 803 corresponding to the shortcut ID, a date and time of edit, and card information at the time of editing, from the table illustrated in FIG. 8. In step S2104, the favorite control unit 211 determines whether the shortcut has been edited by the card information of the card different from the card held over the IC card reading device 131 in step S2102. If the card has been edited (YES in step S2104), the processing proceeds to step S2105. If the card is not edited (NO in step S2104), the shortcut is called as usual, and this processing is ended.

In step S2105, the display operation control unit 201 displays, by using the display 119, a notification indicating that the shortcut has been edited by a user of another IC card. Thereafter, the content of the favorite setting corresponding to the shortcut is displayed on the display 119 and the shortcut is called, and then, this processing is ended.

Through the above-described processing, the user can find out a change of setting content before inputting a start instruction.

Application Example

A setting for promptly executing a function without displaying the setting content on the display 119 at the time of calling a shortcut can also be associated with a shortcut. As illustrated in FIG. 21, in a case where the shortcut associated with the setting for promptly executing the function is called by the card information, prompt execution of the function is prevented according to the processing in step S2104 if the content of the favorite setting corresponding to the shortcut has been edited. Thereafter, the display operation control unit 201 displays the content of the favorite setting corresponding to that shortcut on the display 119, and prompts the user to confirm the setting content. At this time, the notification described in step S2105 can also be displayed.

<Display Order of Shortcuts>

Figure 22:
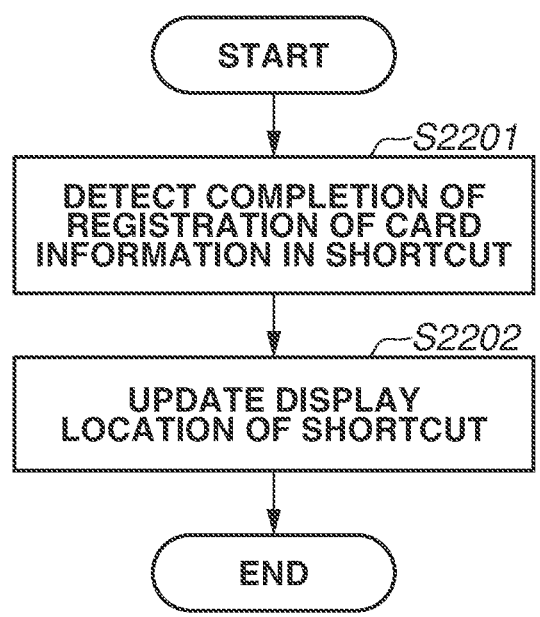
FIG. 22 is a flowchart illustrating updating processing of display order of shortcuts according to one embodiment.

For example, usability of many users can be improved if the shortcuts are displayed in the order from a shortcut associated with a large number of pieces of card information. This control will be described with reference to FIG. 22.

In step S2201, the favorite control unit 211 detects completion of card registration processing in the shortcut illustrated in FIGS. 11 to 14. The favorite control unit 211 refers to the table in FIG. 10 to calculate the number of pieces of card information registered in the shortcut. Further, in step S2202, the favorite control unit 211 updates a display location of each shortcut on the home screen depending on the calculated number of pieces of registered card information.

More specifically, the favorite control unit 211 updates the data stored in the location field 804. The favorite control unit 211 updates the arrangement of the shortcuts on the home screen so that the shortcuts are arranged in the order from a shortcut associated with the large number of registered IC cards. More specifically, shortcuts associated with the larger number of registrations are arranged on the tab 1, and shortcuts associated with the smaller number of registrations are arranged on the tabs 4 and 5.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-082426, filed May 8, 2020, which is hereby incorporated by reference herein in its entirety.

What is claimed is:

1. An image processing apparatus for providing at least any one of a function using a scanner and a function using a printer, the image processing apparatus comprising,
a display;
a reader for reading card information from a card;
at least one memory storing instructions, and
at least one processor that, when executing the instructions, cause the image processing apparatus to:
manage a combination of a function provided by the image processing apparatus and a group of setting values used for the function in association with one or more pieces of card information, wherein a number of pieces of card information that can be associated with the combination of the function and the group of setting values has an upper limit; and
execute display control on the display, wherein, in a case where first card information and second card information are managed in association with a first combination that is a combination of the function provided by the image processing apparatus and the group of setting values used for the function and if the first card information or the second card information is read by the reader, the display control controls a screen for the function corresponding to the first combination to display in a state where the corresponding group of setting values is applied, and
wherein, in a case where it is determined that the upper limit is not exceeded when new card information is to be registered in association with the first combination, the new card information is managed in association with the first combination.

2. The image processing apparatus according to claim 1, wherein, in a case where an authentication function of the image processing apparatus is not enabled, the display control controls the screen for the function corresponding to the first combination to display in a state where the corresponding group of setting values is applied, if the first card information or the second card information is read by the reader while a home screen is being displayed on the display.

3. The image processing apparatus according to claim 1, wherein, in a case where it is determined that the upper limit is exceeded when the new card information is to be registered in association with the first combination, a notification indicating that the new card information cannot be registered is issued.

4. The image processing apparatus according to claim 1, wherein, in a case where it is determined that the upper limit is exceeded when the new card information is to be registered in association with the first combination, one of pieces of card information registered in association with the first combination is deleted, and the new card information is managed in association with the first combination.

5. The image processing apparatus according to claim 1, wherein, in a case where it is determined that the upper limit is exceeded when new card information is to be registered in association with the first combination, the first combination is duplicated to acquire a second combination having a content similar to a content of the first combination and the new card information is managed in association with the duplicated second combination.

6. The image processing apparatus according to claim 1, wherein the instructions further cause the image processing apparatus to edit a group of setting values corresponding to the managed combination.

7. The image processing apparatus according to claim 6, wherein, in a case where a plurality of pieces of card information is associated with the managed combination, a notification indicating a group of setting values corresponding to the combination cannot be edited is issued.

8. The image processing apparatus according to claim 6, wherein, in a case where a plurality of pieces of card information is associated with the managed combination, a group of setting values corresponding to the combination is edited when card information satisfying a predetermined condition is read.

9. The image processing apparatus according to claim 6, wherein a notification indicating that the group of setting values corresponding to the managed combination has been edited is issued in a case where a combination including an edited content is called.

\* \* \* \* \*